(12) United States Patent
Meason et al.

(10) Patent No.: US 11,187,202 B2
(45) Date of Patent: Nov. 30, 2021

(54) POWER GENERATING APPARATUS

(71) Applicant: Orbital Marine Power Limited, Orkney Islands (GB)

(72) Inventors: Jonathan Meason, Kirkwall (GB); Calum Miller, Kirkwall (GB); William Annal, Kirkwall (GB); Andrew Harrison, Kirkwall (GB); Axel Bondoux, Kirkwall (GB); Ross McKay Henderson, Edinburgh (GB); Carn Nathaniel George Gibson, Edinburgh (GB); Charles Andrew Edward Taylor, Pencaitland (GB); Jonathan Ian Benzie, Gifford (GB)

(73) Assignee: Orbital Marine Power Limited, Orkney Islands (GB)

( * ) Notice: Subject to any disclaimer, the term of this patent is extended or adjusted under 35 U.S.C. 154(b) by 7 days.

(21) Appl. No.: 16/470,912

(22) PCT Filed: Nov. 6, 2017

(86) PCT No.: PCT/GB2017/053327
§ 371 (c)(1),
(2) Date: Jun. 18, 2019

(87) PCT Pub. No.: WO2018/115806
PCT Pub. Date: Jun. 28, 2018

(65) Prior Publication Data
US 2020/0088157 A1 Mar. 19, 2020

(30) Foreign Application Priority Data
Dec. 22, 2016 (GB) ...................... 1621970

(51) Int. Cl.
*F03B 13/26* (2006.01)
*F03B 17/06* (2006.01)

(52) U.S. Cl.
CPC .......... *F03B 13/264* (2013.01); *F03B 17/061* (2013.01)

(58) Field of Classification Search
None
See application file for complete search history.

(56) References Cited

U.S. PATENT DOCUMENTS

| 7,105,942 | B2 * | 9/2006 | Henriksen | ............. F03B 17/061 |
|---|---|---|---|---|
| | | | | 290/55 |
| 7,438,504 | B2 * | 10/2008 | Henriksen | ............... B63B 21/50 |
| | | | | 405/223.1 |
| 10,247,166 | B2 * | 4/2019 | Berta | ....................... F03B 3/145 |

FOREIGN PATENT DOCUMENTS

| GB | 2348250 A | 9/2000 |
|---|---|---|
| WO | 03006825 A1 | 1/2003 |

(Continued)

OTHER PUBLICATIONS

International Search Report, International Application No. PCT/GB2017/053327, ISA (dated Jan. 22, 2018).

(Continued)

*Primary Examiner* — Michael Lebentritt
*Assistant Examiner* — Jason G Davis
(74) *Attorney, Agent, or Firm* — Wright IP & International Law; Eric G. Wright

(57) ABSTRACT

Disclosed herein is a power generating apparatus for extracting energy from flowing water. The apparatus comprises a buoyancy vessel, and a turbine assembly coupled to the buoyancy vessel which comprises a turbine rotor mounted to a nacelle, and a support structure. The turbine assembly is pivotally moveable between a first position and a second position. When the power generating apparatus is floating on a body of water, in the first position the nacelle is fully submerged below the water surface; and in the second position at least a part of the nacelle projects above the water (Continued)

surface. Movement of the turbine assembly from the first position to the second position is buoyancy assisted, for example by providing the turbine assembly with positive buoyancy or selectively increasing its buoyancy.

Movement of the turbine assembly to the second position may be desirable to reduce the draft or the drag of the power generating apparatus, for example when the power generating apparatus is being relocated, or to prevent damage during storms. In addition, when in the second position it is possible to gain access to the nacelle for maintenance or repair.

18 Claims, 12 Drawing Sheets

(56) References Cited

FOREIGN PATENT DOCUMENTS

| WO | 2004104411 A1 | 12/2004 |
| WO | 2005103484 A2 | 11/2005 |

OTHER PUBLICATIONS

"Unknown", Jun. 17, 2016, XP055436265, Retrieved from the Internet: http://www.industrial-electronics.com/engineering-industrial/images/phs_5-8a1.jpg [retrieved on Dec. 18, 2017]; the whole document.

"The Great Debate: A Question Of Scale Big V Small" (PowerPoint Presentation), Peter Fraenkel, All-Energy Exhibition & Conference 2015, Fraenkel-Wright Ltd., Glasgow, Scotland (May 6-7, 2015).
Sustainable Marine Energy Ltd., "PLAT-I", https://www.sustainablemarine.com/plat-i (Unknown, at least as early as Nov. 20, 2020).
Bluewater Energy Services B.V., "Floating Tidal Systems", https://www.bluewater.com/products-technology/floating-tidal-systems/ (Unknown, at least as early as Dec. 4, 2019).
Sustainable Marine Energy Ltd., "PLAT-I", https://web.archive.org/web/20190604022234/https://sustainablemarine.com/plat-i (Unknown, at least as early as Jun. 4, 2019).
Sustainable Marine Energy Ltd., "PLAT-I Web Brochure", https://web.archive.org/web/20190604022234/https://s3-eu-west-1.amazonaws.com/assets-sustainablemarine-com/downloads/SME_PLAT-I-Web-Brochure.pdf (Unknown, at least as early as Jun. 4, 2019).
Maslin, Elaine, "Tapping Asia's Marine Energy Market", https://www.oedigital.com/news/445280-tapping-asia-s-marine-energy-market (Oct. 30, 2017).
McDowell et al., "First Steps toward a Multi-Parameter Optimisation Tool for Floating Tidal Platforms—Assessment of an LCoE-Based Site Selection Methodology", https://ore.exeter.ac.uk/repository/bitstream/handle/10871/29239/final%20draft%20John%20EWTEC.pdf? (Aug. 27, 2017).
EMEC The European Marine Energy Centre Ltd., "Bluewater Energy Services", http://www.emec.org.uk/about-us/our-tidal-clients/bluewater-energy-services/ (Unknown, at least as early as Jul. 21, 2013).
Communication Under Rule 71(3) EPC, EP Application No. 17795040.9-1004, EPO (dated Nov. 19, 2020).

* cited by examiner

POWER GENERATING APPARATUS

FIELD OF THE INVENTION

The invention relates to the field of power generating apparatus, for extracting energy from flowing water, and in particular to a floating generating apparatus for use for example in the marine environment.

BACKGROUND TO THE INVENTION

In recent years there has been a move towards energy generation from renewable energy sources, including the use of movable apparatus such as turbines to harvest energy from fluid movement, such as wind, tidal and wave power.

Energy generation from flowing water benefits from being capable of generating a relatively predictable energy supply, whether from a tidal stream or a river. A great number of powered generating apparatus for generating electricity from flowing water have been proposed; including apparatus fixed to the seabed, for example as described in US2015260148 (Aquantis, Inc), and floating apparatus, for example as described in WO 2015/090414 (Bluewater Energy Services).

Floating generators provide both a visible above-water warning that the generator is present, and are generally better able to utilise the faster streams that occur near the water surface (particular tidal streams) and accommodated changes in water level (particularly tidal changes).

Generating apparatus of this type may be large scale, particularly for tidal and marine applications, and so may be costly to manufacture and deploy. Some of these problems were addressed by the generating apparatus described by the applicant in EP1831544. The generating apparatus described in EP1831544 has turbine nacelles capable of being stowed close to the main buoyancy vessel, which reduces both the draft and the hydrodynamic drag of the generator. However, in some circumstances it may be desirable to still further reduce drag and/or draft.

Aggressive subsurface conditions also provide significant challenges in the use of such generating apparatus, and there is generally a trade-off between the costs of accessing normally submerged components for maintenance, and the engineering costs of apparatus engineered for very long service intervals.

There remains a need for generating apparatus for extracting energy from flowing water which address or mitigates one or more of these issues.

SUMMARY OF THE INVENTION

According to a first aspect of the invention, there is provided a power generating apparatus for extracting energy from flowing water, comprising:
 a buoyancy vessel, and a turbine assembly coupled to the buoyancy vessel;
  the turbine assembly comprises a turbine rotor mounted to a nacelle, and a support structure;
   the support structure being coupled at its inboard end to the buoyancy vessel and at its outboard end to the nacelle;
 the turbine assembly being pivotally moveable between a first position and a second position;
 wherein, when the power generating apparatus is floating on a body of water;
  in the first position the nacelle is fully submerged below the water surface; and
  in the second position at least a part of the nacelle projects above the water surface.

In the first position, the nacelle is submerged and the turbine rotor is capable of being driven by movement of water flowing past the power generating apparatus (for example a tidal stream or the flow of a river). Movement of the turbine assembly to the second position may be desirable to reduce the draft and in some instances also the drag of the power generating apparatus, for example when the power generating apparatus is being relocated.

In the second position, at least a portion of the nacelle projects above the water surface, so as to provide access thereto for maintenance or repair. This may avoid the need for large and expensive barges/cranes, e.g. to raise the entire power generating apparatus from the water and so facilitate more frequent, rapid and cheaper maintenance than would otherwise be possible.

Increased ease of access to the nacelle or support structure may in turn facilitate the use of equipment having a shorter services interval, or may enable certain apparatus to be viably located in the turbine assembly (such as fluid filters, lubricating or cooling fluid reservoirs or circuits, or electricity generating equipment). The power generating apparatus of the present invention may therefore avoid some of the design compromises that have previously been required.

The at least a portion of the nacelle projecting above the water surface in the second position may be provided with an access hatch, providing access to apparatus housed therein.

The power generating apparatus may comprise a single buoyancy vessel (as compared, for example to two or more interconnected buoyancy vessels).

The power generating apparatus may comprise two, or more than two, turbine assemblies. The turbine rotor of two such turbine assemblies may be counter-rotating.

The power generating apparatus may comprise two or more turbine assemblies symmetrically disposed in relation to the buoyancy vessel. The power generating apparatus may be configured such that the turbine assemblies are symmetrically disposed at all times (i.e. in the first position, the second position and during movement therebetween). That is to say, the symmetrically disposed turbine assemblies may be symmetrically and pivotally moveable between their first a second positions.

In some embodiments, the power generating apparatus comprises two turbine assemblies, extending symmetrically in relation to a longitudinal axis of the buoyancy vessel.

Such symmetrically disposed turbine assemblies may, in normal use, be tethered together in the first position, for example by a cable extending between the turbine assemblies. The cable may form part of a powered mechanism, for mechanically assisting and/or damping motion between the first and second positions.

Movement of the turbine assembly from the first position to the second position may be buoyancy assisted.

Buoyancy assistance reduces and, in some embodiments eliminates, the mechanical forces that must be applied between the buoyancy vessel and the turbine assembly in order to move from the first to the second position.

It is to be understood that the power generating apparatus as a whole is buoyant and, in use floats on a body of water.

Movement of the turbine from the second position to the first position may also be buoyancy assisted.

The turbine assembly may have neutral or positive buoyancy. The turbine assembly may be negatively buoyant. However, a buoyant volume or volumes defined by the turbine assembly (e.g. a tank or a volume of low density material) may in such embodiments provide a buoyant force that partially offsets the weight of the turbine assembly.

A turbine assembly having at least some buoyancy, including a neutrally buoyant turbine assembly, requires a relatively small force to be applied (e.g. to overcome the inertia of the turbine assembly) to raise at least a part of the nacelle above the water surface.

A positively buoyant turbine assembly may be urged towards the second position, at least in part by a positive buoyant force.

In some embodiments, when in the second position, a positively buoyant turbine assembly may be free to pivot around its hinge arrangement (or the first hinge arrangement, where a second hinge arrangement is present), to allow for relative motion between the turbine assembly and the buoyancy vessel, e.g. under the action of waves or when towing the power generating apparatus.

The buoyancy of the turbine assembly may be selectively variable. For example, the turbine assembly may be configured for the buoyancy to be selectively increased (for example from negatively or neutrally buoyant, to positively buoyant) so as to assist in moving the turbine assembly from the first position to the second position.

Variation of the buoyancy may be achieved by any suitable method, as known to those skilled in the art. For example, one or both of the support structure and the nacelle may comprise one or more ballast tanks, operable to be selectively filled with gas (e.g. air) to increase buoyancy and/or flooded with water to reduce buoyancy.

The power generating apparatus may comprise a powered mechanism, for moving the/each turbine assembly from the first to the second positions and/or from the second to the first position.

Movement between the first and second positions may at least in part be mechanically assisted, by the powered mechanism, e.g. a mechanism comprising a hydraulic ram, an arrangement of cables and a winch, or the like. Movement of the turbine assembly may be initiated by a powered mechanism. A powered mechanism may assist in lifting the nacelle, or a greater part of the nacelle, above the water surface.

In normal use, the powered mechanism may be the primary means of moving between the first and second positions, with buoyancy (e.g. by means of buoyant volumes such as tanks within the turbine assembly or assemblies) providing additional assistance. The turbine assemblies may for example be configured for variable buoyancy to be used as a back-up to the powered mechanism, or vice versa.

The powered mechanism may comprise a cable and a winch (examples of which are described below). The winch may be used to limit the rate of movement in the opposite direction, throughout at least the latter part (and in some cases the entire) range of motion of the turbine assembly.

The powered mechanism may be hydraulically powered. A hydraulic mechanism may comprise a hydraulic ram (i.e. a hydraulically controllable piston).

A hydraulic ram may be operatively coupled between the buoyancy vessel and a said turbine assembly (most typically a support structure thereof).

A hydraulic ram may be operatively connected between one or other of the turbine assembly and a mechanical linkage arrangement, wherein the mechanical linkage arrangement is coupled at a first end to the turbine assembly and at a second end to the buoyancy vessel, the distance between the first and second end of the mechanical linkage arrangement being variable by operation of the hydraulic ram.

The hydraulic ram may be pivotally connected to the buoyancy vessel, turbine assembly and mechanical linkage arrangement, as the case may be. A hydraulic ram is typically coupled at two points and each may be pivotal connections.

The buoyancy vessel and/or the turbine assembly (or support structure thereof) may comprise a fly brace, for connection to the mechanical linkage arrangement; to thereby increase leverage.

The mechanical linkage arrangement may comprise two or more pivotally interconnected linkages extending from the first to the second end. In some embodiments, when the turbine assembly is in the first position, the linkages are generally aligned between the first and second ends.

The hydraulic ram may have an axis (along which it deploys in use) that crosses a line described between the first and second ends of the mechanical linkage arrangement; at least when the respective turbine assembly is close to the first position, and optionally throughout the range of motion of the turbine assembly.

The hydraulic ram may have an axis extending generally perpendicular to the said line at least when the respective turbine assembly is close to the first position, and optionally throughout the range of motion of the turbine assembly It will be understood that as the turbine assemblies pivot between the first and second positions, the first and second ends of the mechanical linkage arrangement describe an arc in relation to one another. The powered mechanism may be configured such that the orientation of the axis of the hydraulic ram changes throughout the range of motion of the associated turbine assembly. The angle at which it crosses the line between the first and second ends may remain generally constant (e.g. perpendicular).

In use of the power generating apparatus, forces are transmitted to the buoyancy vessel from the turbine assemblies due to motion of the rotors (e.g. changes in rotor speed or forces applied thereto) and forces which act upon the turbine assembly/assemblies (e.g. caused by waves, changes in tidal force/direction and the like). Where the hydraulic ram deploys along an axis that crosses said arc, it is isolated to some degree from such dynamic forces.

This may be of particular benefit when the turbine assembly is at or near the first, where the leverage applied between the ends of the mechanical linkage arrangement and the hydraulic ram is at a maximum (e.g. when two or more mechanical linkages are aligned). In this way, the hydraulic ram is better able to retain the turbine assembly in the first position, to resist dynamic forces that arise in use.

The hydraulic ram and/or mechanical linkage arrangement (and any associated pivotal connections) are conveniently above the water level, in normal use.

Each turbine assembly may be associated with a hydraulic ram (or more than one hydraulic ram) and, as the case may be, a corresponding mechanical linkage arrangement or arrangements.

A powered mechanism may be used to provide hydraulic resistance to said movement, in one direction, and mechanical assistance in the other direction.

A powered mechanism may be used to control or limit the rate of motion in one or both directions, along at least a part of the range of motion between the first and second positions. For example, where the/each turbine assembly is negatively buoyant, the powered mechanism (e.g. comprising a hydraulic ram as disclosed herein) may control or limit the rate of motion of the/each turbine assembly from the second to the first position.

This methodology may be of particular benefit to the overall stability of the power generating apparatus during movement between the first and second positions, particularly when the turbine assembly is closer to the second position (and thus has the greatest effect on changes in overall buoyancy and stability of the power generating apparatus). Embodiments having more than one turbine assembly may be prone to instability during movement of the turbine assemblies, which instability may be limited by applying mechanical control over the rate and in some cases symmetry of movement.

The powered mechanism may comprise position measurement apparatus, operable to detect the position of the powered mechanism, and thus the/each turbine assembly. The powered mechanism may be associated with a controller operable to control the powered mechanism, based on information received from the position measurement apparatus. This may for example facilitate synchronisation of the movement of two or more turbine assemblies and/or assist in maintaining the stability of the power generating apparatus.

Movement between the first and second positions may be achieved by buoyancy only. For example, a turbine assembly may be positively buoyant so as to be biased towards the second position. A powered mechanism may then be required to move from the second position to the first position. Alternatively, in some embodiments, the buoyancy of a turbine assembly may be selectively increased so as to effect movement from the first to the second position and/or selectively decreased to move from the second position to the first position.

The turbine assembly may be biased towards the first position by negative buoyancy. The turbine assembly may in use be held in the first position by the negative buoyant force (as an alternative to or in addition to being held in the first position by a latch and/or a powered mechanism as disclosed herein). As discussed above, the biasing may be applied by way of selectively variable buoyancy.

Buoyancy assisted movement to the second position, particularly under the action of buoyancy only, may limit or minimize changes in the centre of buoyancy of the power generating apparatus, which might otherwise be detrimental to stability.

One or both of the support structure and the nacelle may be neutrally, positively buoyant or variably buoyant, as the case may be. One or both of the support structure and the nacelle may be negatively buoyant. However, a buoyant volume defined by one or both of support structure and the nacelle may in such embodiments provide a buoyant force that partially offsets their weight.

The buoyancy of the nacelle and the support structure may be variable independently of one another.

Advantageously, the turbine assembly as a whole, or one or both of the nacelle and support structure may be positively buoyant (or their buoyancy variable so as to be provided with a positive buoyancy). This may enable the turbine assembly, or one or more component parts thereof, to be floated into position during assembly or maintenance. This may enable the power generating apparatus to be manufactured in modules and assembled when floating on a body of water. In turn, this modularity may increase the range of assembly options and/or reduce the size and cost of the facilities required to assemble the power generating apparatus. Moreover, the various modules (e.g. the buoyancy vessel and the turbine assembly or assemblies) may be constructed in parallel, further reducing construction time and cost.

In some embodiments, variable buoyancy may be employed to adjust the trim (i.e. the position of the centre of buoyancy) of the turbine assembly, which may assist in aligning or separating couplings, such as flanges, pin joints and the like.

The buoyancy vessel itself may have selectively variable buoyancy (which may be achieved by one or more ballast tanks therein). The buoyancy vessel may be selectively ballasted during movement of the turbine assembly between the first and second position, to improve the stability of the power generating apparatus as a whole during. The buoyancy of the buoyancy vessel may be selectively varied in some instances to adjust trim, for example to assist in alignment during assembly.

The turbine assembly may be pivotally moveable around a hinge arrangement.

The power generating apparatus may comprise any suitable type of hinge arrangement, for example a pin-joint or bushing. The hinge arrangement may comprise a single hinge or multiple hinges, e.g. two or more hinges arranged along an axis. The hinge arrangement may comprise one or more journal bearings, fibre bearings or the like. The hinge arrangement may be water lubricated.

The hinge arrangement may be above or below the water surface.

The hinge arrangement may form part of the turbine assembly, or part of the buoyancy vessel.

The turbine assembly may be coupled to the buoyancy vessel via the hinge arrangement. For example, the turbine assembly may comprise a part of the hinge arrangement, such as one or other of a padeye or a hinge clevis, and the buoyancy vessel may comprise a complimentary part of the hinge arrangement.

The turbine assembly may alternatively be coupled to the buoyancy vessel by a separate coupling arrangement, such as a flange coupling or the like. In such embodiments, the hinge arrangement may be inboard of the coupling arrangement (i.e. forming part of the buoyancy vessel) or outboard of the hinge arrangement (i.e. forming part of the support structure of the turbine assembly).

The turbine assembly may pivot around an axis that is generally parallel to a longitudinal axis of buoyancy vessel.

In the first position the turbine assembly may extend below, and optionally to the side of (i.e. extending diagonally below), the buoyancy vessel. In the second position, the turbine assembly may extend generally to the side of the buoyancy vessel.

The turbine assembly may be moveable from a second position to a third position (and vice versa). Movement between the second and third positions may, at least in part, be mechanically assisted, by way of a powered mechanism. Movement between the second and third positions may, at least in part, be buoyancy assisted.

The turbine assembly may be moved to the third positon to move a greater portion of the turbine assembly above the water surface. For example, in the third position, all of the nacelle (and/or the support structure) may be above the water surface.

The turbine assembly may be moved to the third position to reduce the beam of the power generating apparatus.

The movement between the second and third positions may be effected by way of a secondary hinge arrangement.

A secondary hinge arrangement may operate around an axis generally parallel to the hinge arrangement. For example, the turbine assembly may be pivotable around hinge arrangement and "foldable" around a secondary hinge arrangement disposed between the outboard end of the support structure and the hinge arrangement.

The secondary hinge arrangement may operate around an axis parallel to that of the hinge arrangement.

The secondary hinge arrangement may operate around an axis at an angle, for example perpendicular, to that of the hinge arrangement. The secondary hinge arrangement may operate around an axis disposed towards the forward or rear face (with respect to the normal orientation of the turbine rotor) of the support structure, whereby the turbine assembly may be moveable around the secondary hinge arrangement to/from a third position in which the nacelle is closer to the buoyancy vessel than when in the second position.

In the third position, the nacelle may be close to or against the buoyancy vessel. In the third position the support structure may be generally aligned with the buoyancy vessel.

The turbine assembly may be adapted to be latched in one or more of the first, second or, where applicable, the third position.

The hinge arrangement and/or secondary hinge arrangement may for example comprise a latch or be associated with a latch or a component part thereof.

A hinge arrangement may be associated with more than one latch, for example to enable the turbine assembly to be retained in each of two positions between which a hinge arrangement can move.

The power generating apparatus may comprise any suitable type of latch or latches. For example, the apparatus may comprise a magnetic latch between a permanent or electro magnet and corresponding material attracted thereto. The apparatus may comprise a mechanical or electromechanical latch, for example comprising a shear pin.

The turbine assembly may optionally be retained in the first position by a cable extending for example between the nacelle and a location on the buoyancy vessel or another turbine assembly.

Movement towards one or more of the first or second (or, where applicable, the third) position may be damped.

Motion may be mechanically damped, for example by a buffer. Each turbine assembly may comprise a buffer, or a component thereof. A turbine assembly may be buffered against the buoyancy vessel, or (where there are two or more symmetrically disposed turbine assemblies) against another turbine assembly.

Motion may be "damped" by varying the buoyancy of the turbine assembly, as it approaches a respective position. This may be achieved for example by the provision of more than one, or a series, of ballast tanks, which may be selectively filled or emptied so as to vary the buoyancy force as a turbine assembly approaches the first or second position, as the case may be.

Motion may in some embodiments be damped using a powered mechanism, for example which may act as a "brake" to movement toward the first and/or second position.

A powered mechanism for assisting movement between the first and second positions may in some circumstances be used to brake or damp motion in the opposite direction.

The power generating apparatus may typically comprise various additional apparatus. The skilled addressee will also appreciate that the location or distribution of such additional apparatus may be varied without departing from the scope of the invention.

For example, the power generating apparatus may comprise apparatus as required to harvest energy, to convert this into electrical energy and/or to transform, store and/or transmit such electrical to an electrical distribution system.

The power generating apparatus may also comprise apparatus required to vary buoyancy, by selectively flooding and venting ballast tanks.

A turbine assembly, or its nacelle and/or support structure, may comprise one or more ballast tanks.

The power generating apparatus may comprise a conduit for delivering air to a ballast tank (to increase buoyancy). In order to flood a ballast tank, the power generating apparatus may comprise an inlet or inlet conduit between the surrounding water and the ballast tank. In order to flood/vent a ballast tank, the apparatus may comprise a vent conduit or vent manifold to selectively release air/water from the ballast tank. An outlet of the vent conduit/manifold may be positioned above the water surface.

The apparatus means for delivering air to and/or pumping water from, a ballast tank is most typically situated on the buoyancy vessel. Such apparatus may comprise for example a source of compressed air (e.g. a cylinder or a compressor), or connections for connecting thereto. Selectively operable valves for operating a variable buoyancy system may be located on the buoyancy vessel and/or in the turbine assembly. Such apparatus may comprise one or more pumps.

The nacelle may comprise an electrical generator. Advantageously, this may be an in-line generator, optionally a direct-drive generator (i.e. lacking a gearbox). The generator may be any suitable type of generator; most typically comprising an electrical rotor and stator, the electrical rotor typically being driven by the turbine rotor. Electricity may alternatively also be generated indirectly from fluid circulated under the action of the turbine rotor.

It may be desirable for the turbine rotor to comprise variable-pitch rotor blades. For example, feathering the rotor blades during storm conditions may reduce loads applied through the turbine assembly and prevent damage.

Accordingly, the nacelle (and/or the turbine rotor in particular) may comprise a pitch adjustment arrangement. Various means are known in the art for adjusting turbine blade pitch, both in relation to wind and marine/water turbines. For example, the turbine rotor may comprise a rotor blade (or blades) rotatably mounted to a hub around an axis along the rotor blade, the pitch being adjustable by way of a worm gear or a pinion coupled to a planary gear or slew ring.

The pitch adjustment arrangement may be electromechanically actuated. The pitch adjustment arrangement may be housed in the rotor. Examples of turbine blade pitch adjustment are described in GB996182, CN202266366 or GB2348250 or WO2009004420, to which the skilled reader is directed.

The turbine rotor may be configured to reverse the pitch of the rotor blades. The rotor blades may be rotatable through 180 degrees or 360 degrees. The facility to reverse the pitch of rotor blades may enable energy to be harvested regardless of the direction of the water flow, without changing the position of the power generating apparatus as a whole. The pitch may be revered so as to harvest energy when the direction of a tidal stream changes. It may also be desirable to adjust the pitch in response to variations in water flow.

The buoyancy vessel may have any suitable configuration. However, in some embodiments, the buoyancy vessel is elongate and may be generally cylindrical, so as to provide limit hydrodynamic drag and wave loading.

A generally cylindrical (in cross section) buoyancy is inherently extremely strong and may be of particular benefit in adverse weather conditions, such as may be encountered in the marine environment.

The buoyancy vessel may itself be provided with a ballasting system (comprising ballast tanks, desirably front and rear), by which the trim of the power generating apparatus may be adjusted, in some embodiments automatically. The ballasting system may be used to compensate for the varying forces applied by a river or tidal flow impinging on the turbine rotor or other parts of the turbine assembly.

The or each turbine assembly may be coupled to a bow or stern section of the buoyancy vessel (it being understood that in some embodiments, the terms bow and stern are arbitrary).

The buoyancy vessel may comprise a keel.

The power generating apparatus is typically anchored in its final position. Any suitable anchoring arrangement may be employed, for example conventional cables between an anchoring structure (typically a concrete block) on the bed of a body of water, and suitable fixings at or near one or both ends of the buoyancy vessel. Also suitable is a rotatable anchor such as described in EP2300309 (Scotrenewables Tidal Power Limited).

According to a second aspect of the invention there is provided a turbine assembly for a power generating apparatus according to the first aspect, the turbine assembly comprising a turbine rotor mounted to a nacelle, and support structure; the support structure being configured to be coupled at its inboard end to the buoyancy vessel and coupled at its outboard end to the nacelle; when coupled to a said buoyancy vessel in use, the turbine assembly being pivotally moveable between a first position and a second position; said movement being buoyancy assisted.

The turbine assembly may be neutrally or positively buoyant, or adapted for selectively variable buoyancy.

The terms inboard and outboard refer to the intended orientation of the turbine assembly in relation to a buoyancy vessel, in normal use.

The turbine assembly as a whole, or one or both of the support structure and the nacelle, may be neutrally buoyant, positively buoyant or adapted for selectively variable buoyancy.

The turbine assembly may comprise a hinge arrangement. The turbine assembly may comprise a component part of a hinge arrangement, such as one or other of a hinge clevis or hinge padeye (i.e. to be coupled to a complimentary part a hinge arrangement attached to a buoyancy vessel).

The turbine assembly may comprise a latch, or a component part of a latch, by which the turbine assembly may be latched in the first and/or the second position, in use. The hinge arrangement may comprise or be associated with the latch or component part thereof.

The turbine assembly may comprise a secondary hinge arrangement, by which the turbine assembly may move between the second and a third position.

Further preferred or optional features of the turbine assembly correspond to those disclosed above in relation to the first aspect.

In a third aspect of the invention there is provided a method of operating a power generating apparatus that comprises a buoyancy vessel floating on a body of water, and a turbine assembly coupled to the buoyancy vessel; the turbine assembly comprising a turbine rotor mounted to a nacelle, and support structure; the support structure being coupled at its inboard end to the buoyancy vessel and at its outboard end to the nacelle:
the method comprising:
pivotally moving the turbine assembly from a first position in which the nacelle is fully submerged below the water surface; to a second position in which at least a part of the nacelle projects above the water surface.

The power generating apparatus may comprise a single buoyancy vessel. The power generating apparatus may comprise two (or more than two) turbine assemblies symmetrically disposed about the buoyancy vessel. The method may comprise simultaneously moving symmetrically disposed turbine assemblies from the first position to the second position (or vice versa).

By simultaneously moving the symmetrical turbine assemblies (i.e. so that their movement is synchronised, and the turbine assemblies are on equivalent parts of their respective paths between the first and second positions) the stability of the power generating apparatus can be maintained. This may for example obviate the need for additional structures to stabilize the apparatus.

The buoyancy vessel may have a longitudinal axis and the method may comprise pivotally moving the turbine assembly around an axis or rotation parallel thereto.

The movement from the first to the second position may be mechanically assisted, for example by a powered mechanism such as a winch or hydraulic ram, as disclosed herein. Mechanical assistance may for example be used to overcome inertia or hydrodynamic drag and/or to raise or further raise a portion of the nacelle above the water surface.

The method may alternatively or in addition comprise moving the turbine assembly from the first position to the second position with the assistance of buoyancy.

The turbine assembly may be passively buoyant (for example, comprising a buoyant volume such as a tank or a volume of low density material).

The turbine assembly may be positively buoyant, and the movement from the first to the second position may be effected by releasing the turbine assembly. For example, a latch or tether may be released to enable the turbine assembly to move from the first to the second position under the action of a buoyant force.

The turbine assembly may be configured for its buoyancy to be selectively variable (as disclosed above in relation to the first aspect). Accordingly, movement from the first to the second position may be effected, at least in part by increasing the buoyancy of the turbine assembly. Thus, the method may comprise increasing the buoyancy of the turbine assembly.

The buoyancy may be increased from negatively buoyant to neutrally or positively buoyant. The buoyancy may be increased from negatively or neutrally buoyant to positively buoyant.

The method may comprise moving the turbine assembly from the second to the first position.

The movement from the second to the first position may be mechanically assisted.

The method may comprise moving the turbine assembly from the second to the first position with the assistance of buoyancy.

Movement from the second to the first position may be effected, at least in part by decreasing the buoyancy of the turbine assembly. Thus, the method may comprise decreasing the buoyancy of the turbine assembly.

The buoyancy may be decreased from positively buoyant to neutrally or negatively buoyant. The buoyancy may be decreased from positively or neutrally buoyant to negatively buoyant.

The method may comprise flooding a ballast tank. The method may comprise flooding a ballast tank, for example by opening one or more valves and allowing water to enter the ballast tank. The method may comprise emptying water from a ballast tank, for example by displacing water in the ballast tank with air, or by pumping water out of the ballast tank.

The method may comprise flooding more than one ballasting tank, in a predefined sequence and/or simultaneously.

Varying the buoyancy of the turbine assembly may comprise varying the buoyancy of a part of the turbine assembly, such as the nacelle (e.g. by flooding or emptying a ballast tank located in the nacelle).

The method may comprise varying the buoyancy of the buoyancy vessel. The buoyancy of the buoyancy vessel may be selectively decreased, prior to movement of the turbine assemblies.

Decreasing the buoyancy of the buoyancy vessel may, in whole or in part, compensate for the overall increase in buoyancy of the power generating apparatus that results from increasing the buoyancy of the or each turbine assembly.

In some embodiments, the buoyancy of the buoyancy vessel can increased (i.e. the buoyancy vessel can be ballasted prior to attaching the (or each) turbine assembly. For example, in some embodiments, ballasting may be required to stabilise the buoyancy vessel in an "upright" position, whereas the ballasting may be removed once the or each turbine assembly has been attached.

The method may comprise pivotally moving the turbine assembly around a hinge arrangement, at or near the inboard end of the support structure.

The method may comprise moving the turbine assembly from a second position to a third position, to reduce the beam of the power generating apparatus. The method may comprise reducing the beam by folding the support structure around a secondary hinge arrangement disposed between the hinge arrangement and the outboard end of the support arrangement. The method may comprise reducing the beam by pivoting the turbine assembly around a secondary hinge arrangement disposed towards the forward or rear face of the support structure (typically near the inboard end), around an axis at an angle to, for example perpendicular to, that of the hinge arrangement.

The method may comprise retaining or latching the turbine assembly into one or more of the first, second or, where present, the third positions. The method may comprise releasing a latch or other means (e.g. a magnet or a cable) by which the turbine assembly is retained in one of the said positons.

The power generating apparatus may comprise more than one turbine assembly, and the method may comprise moving more than one turbine assembly. More than one turbine assembly may be moved simultaneously.

The method may comprise damping the motion of the or each turbine assembly. Damping may comprise limiting the rate of motion of the or each turbine assembly during at least a part of its range of motion.

The method may form part of a method of deploying a power generating apparatus. The method may form part of a method of maintenance or repair of a power generating apparatus.

The invention extends in a fourth aspect to a method of assembling a power generating apparatus for extracting energy from flowing water, the method comprising providing a buoyancy vessel and a turbine assembly according to the second aspect, floating on a body of water; bringing an inboard end of the floating turbine assembly into a coupling position with the buoyancy vessel; and coupling an inboard end of the support structure of a turbine assembly according to the second aspect to the buoyancy vessel.

The invention also extends to a method of disassembling a power generating apparatus, by conducting these steps in reverse order. For example, the method may comprise disassembly, for maintenance, repair or replacement of a turbine assembly, followed by assembly as described herein.

The turbine assembly may be positively buoyant, or be provided with temporary buoyancy aids to facilitate assembly/disassembly.

Coupling may comprise bolting or welding the inboard end of the support structure to the buoyancy vessel, typically above the water surface. Coupling may comprise assembling a hinge arrangement, for example by bringing together and/or coupling complimentary parts of a hinge arrangement. Assembling a hinge arrangement may comprise inserting a shear pin.

The method may comprise adjusting the trim of the turbine assembly, to facilitate alignment of complimentary parts of a coupling or hinge arrangement on the buoyancy vessel and turbine assembly, respectively.

The turbine assembly may have selectively variable buoyancy, and the trim may be adjusted by adjusting the buoyancy of the turbine assembly, or one or other of the support structure or nacelle.

Thus, in accordance with the invention, the power generating apparatus need not be fully assembled before launch, and instead may be assembled in modules (the buoyancy vessel and one or more turbine assemblies), and the modules floated into position in port or in situ at a power generating site on a body of water.

In a fifth aspect, the invention extends to a method of assembling a power generating apparatus for extracting energy from flowing water, the method comprising providing a buoyancy vessel comprising a support structure coupled at its inboard end to the buoyancy vessel, and a nacelle having a turbine rotor, the buoyancy vessel and the nacelle floating on a body of water; bringing the floating nacelle into a coupling position with the outboard end of the support position; and coupling the nacelle to the outboard end of the support structure.

The invention also extends to a method of disassembly, by conducting these steps in reverse order. For example, the method may comprise disassembly, for maintenance, repair or replacement of a nacelle, followed by assembly as described herein.

It is to be understood that reference herein to the water surface, and references thereto components being submerged or above the water surface, refer to the power generating apparatus when floating on a body of water.

Moreover, the precise position of the water line (i.e. water surface in relation to the power generating apparatus) may depend on water salinity, temperature, loading on the vessel and the like. The position of the water line of a buoyant apparatus may be readily determined by those skilled in the art, by observation or calculation.

Preferred and optional features of each aspect of the invention correspond to preferred and optional features of each other aspect of the invention.

DESCRIPTION OF THE DRAWINGS

Example embodiments of the invention will now be described with reference to the following drawings in which.

DETAILED DESCRIPTION OF EXAMPLE EMBODIMENTS

Figure 1A:
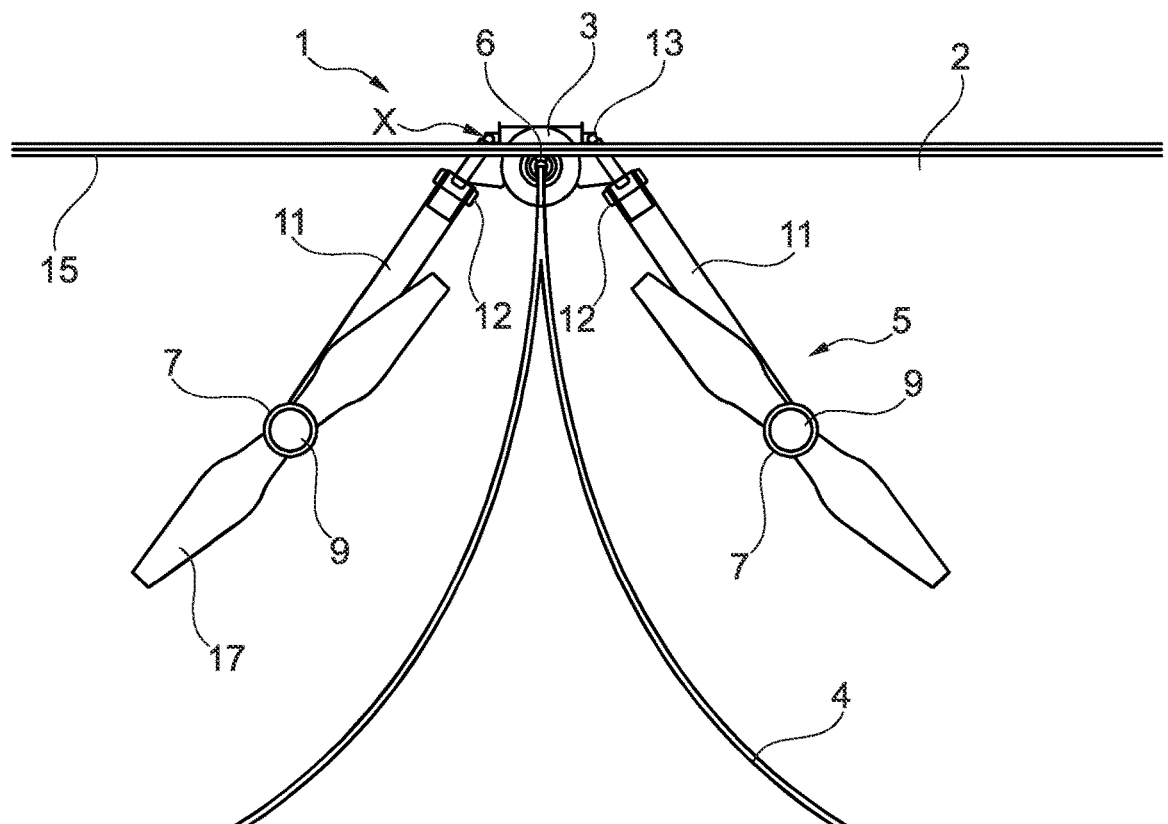
FIG. 1 shows (a) a front view and (b) a side view of a power generating apparatus, with turbine assemblies in a first position.
Figure 1B:
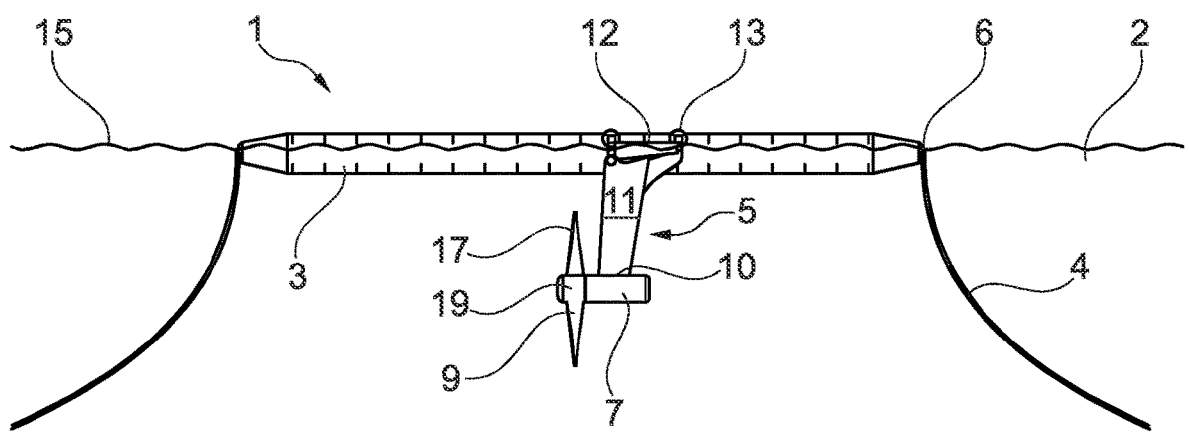

FIG. 1 shows (a) a front view and (b) a side view of a power generating apparatus 1 for extracting energy from flowing water. In normal use, the apparatus floats on a body of water 2 and is moored to the bed of the body of water (not shown) via cables 4, attached to eyelets 6, in a conventional manner.

The apparatus 1 is a marine tidal turbine, adapted to extract energy from a tidal flow. However extraction of energy from a river is also possible.

The power generating apparatus has a buoyancy vessel 3, and a turbine assembly 5 coupled to each side of the buoyancy vessel. Whereas the turbine assemblies are symmetrically disposed around the buoyancy vessel of the apparatus 1, in other embodiments (not shown) there may be a single turbine assembly, or a greater number.

Figure 2A:
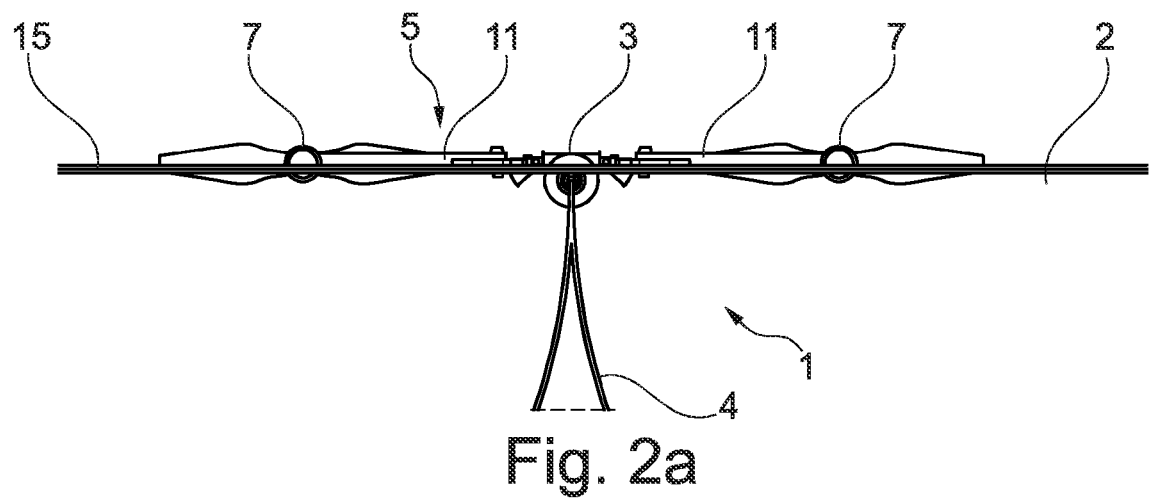
FIG. 2 shows (a) a front view and (b) a perspective view of the power generating apparatus with the turbine assemblies in a second position.
Figure 2B:
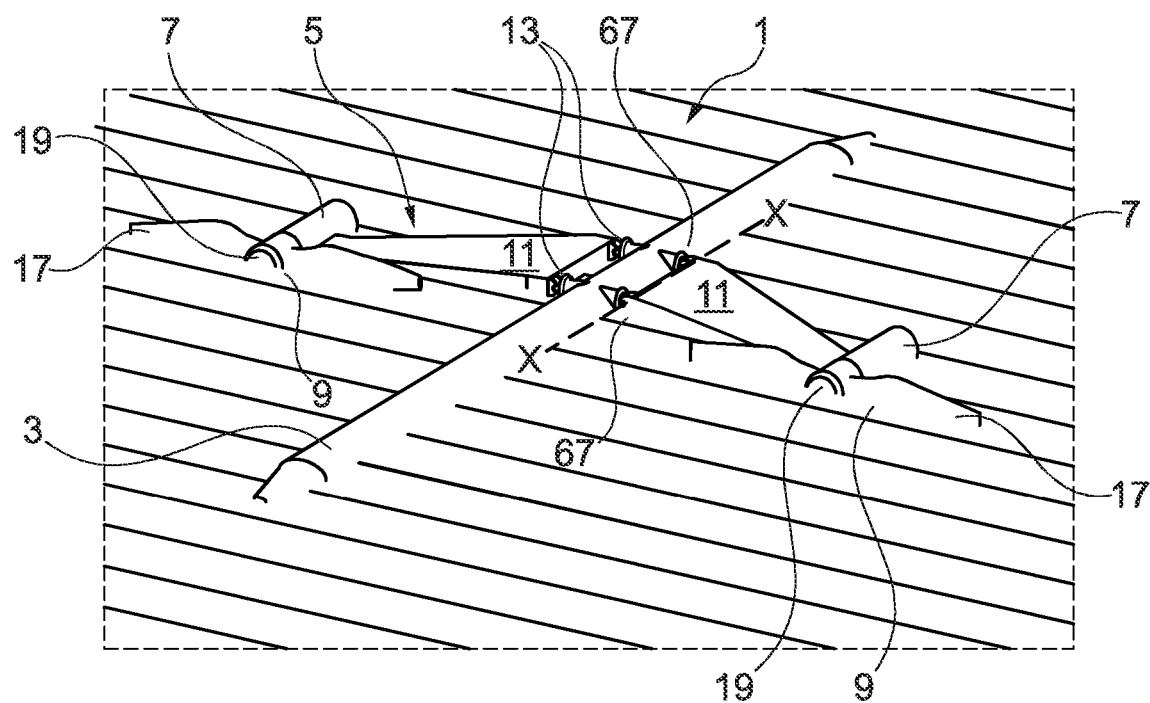

Each turbine assembly 5 has a nacelle 7, to which a turbine rotor 9 is rotatably mounted. The nacelle 7 is coupled to the outboard end 10 of a support structure 11. At its inboard end 12, the support structure is coupled to the buoyancy vessel 3. Each turbine assembly 5 is pivotally moveable, around a hinge arrangement 13, between a first position shown in FIGS. 1(a) and 1(b), and a second position shown in FIGS. 2(a) and 2(b). The axis X about which the hinge arrangement moves is parallel to a central axis through the buoyancy vessel, and so is generally parallel the water surface.

In the first position, the nacelles 7 are fully submerged below the water surface 15. The turbine rotor is thus positioned to rotate under the action of a flow of water past the apparatus 1. Typically the nacelle 5 is positioned at sufficient depth that the rotor blades 17 of the turbine rotor 9 remain submerged throughout their range of motion around the hub 19 of the turbine rotor 9.

In the second position, the upper part of the nacelles 7 project above the water surface 15.

Movement of the turbine assemblies 5 to the second position reduces both the draft and the drag of the power generating apparatus 1, which may be required for towing to its final position.

Figure 3:
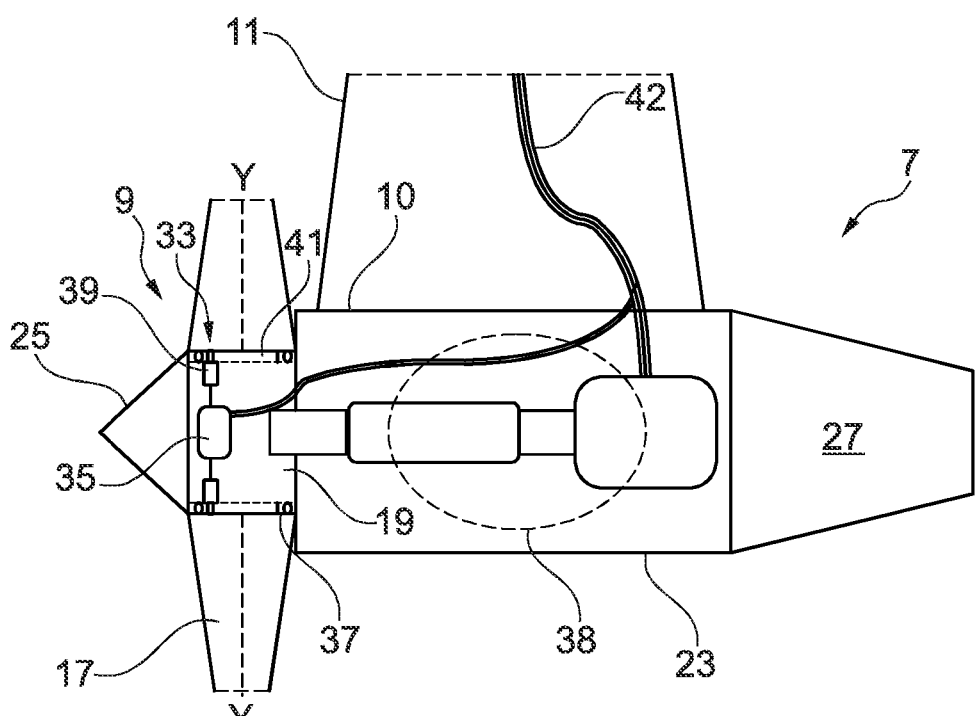
FIG. 3 shows a schematic cross sectional view of a nacelle of the power generating apparatus.

FIG. 3 shows a schematic cross sectional view of a nacelle 7.

The nacelle has a water tight outer casing 23 and nose and tail cone sections 25, 27 each enclosing an air filled volume; together providing the nacelle with a positive buoyancy. The outer casing 23 is generally cylindrical, and the nacelle 7 is bolted to the outboard end 10 of the support structure 11, via a flat or saddle shaped flange (not shown).

The hub 19 of the turbine rotor 9 is connected to a drive shaft 29, which directly drives an electrical generator 31. The electrical generator is of a conventional type, having a rotor and stator, and will not be described in further detail. In alternative embodiments, the nacelle may include a gearbox arrangement between the electrical generator and the rotor.

The hub 19 also includes a pitch adjustment mechanism 33, controllable by the control unit 35. The rotor blades 17 are rotatable around their axes Y on slew bearings 37. Rotation is effected by one or pinion drives 39 that engage with a planary gear 41 rotatable within the slew bearing, to which the rotor blades are mounted.

A wiring loom 42 extends from the buoyancy vessel, through the support structure 11 and into the nacelle 7, and carries control and power cabling for the control unit, pinion drives and control cabling and for generator, as well as a conduit from which generated current can be drawn (and either stored in the buoyancy vessel or transformed and/or transmitted therefrom to an electricity distribution system, as discussed below). It will be appreciated that the electrical connection with the control unit and pinion drives must be adapted for rotation of the rotor, by way of a rotatable electrical connection(s); e.g. a slip ring or the like (not shown).

The nacelle 7 is also provided with an access hatch 38 (shown in outline in FIG. 3), which provides access to the internal components for maintenance, when the respective turbine assembly 5 is in the second position.

Figure 4:
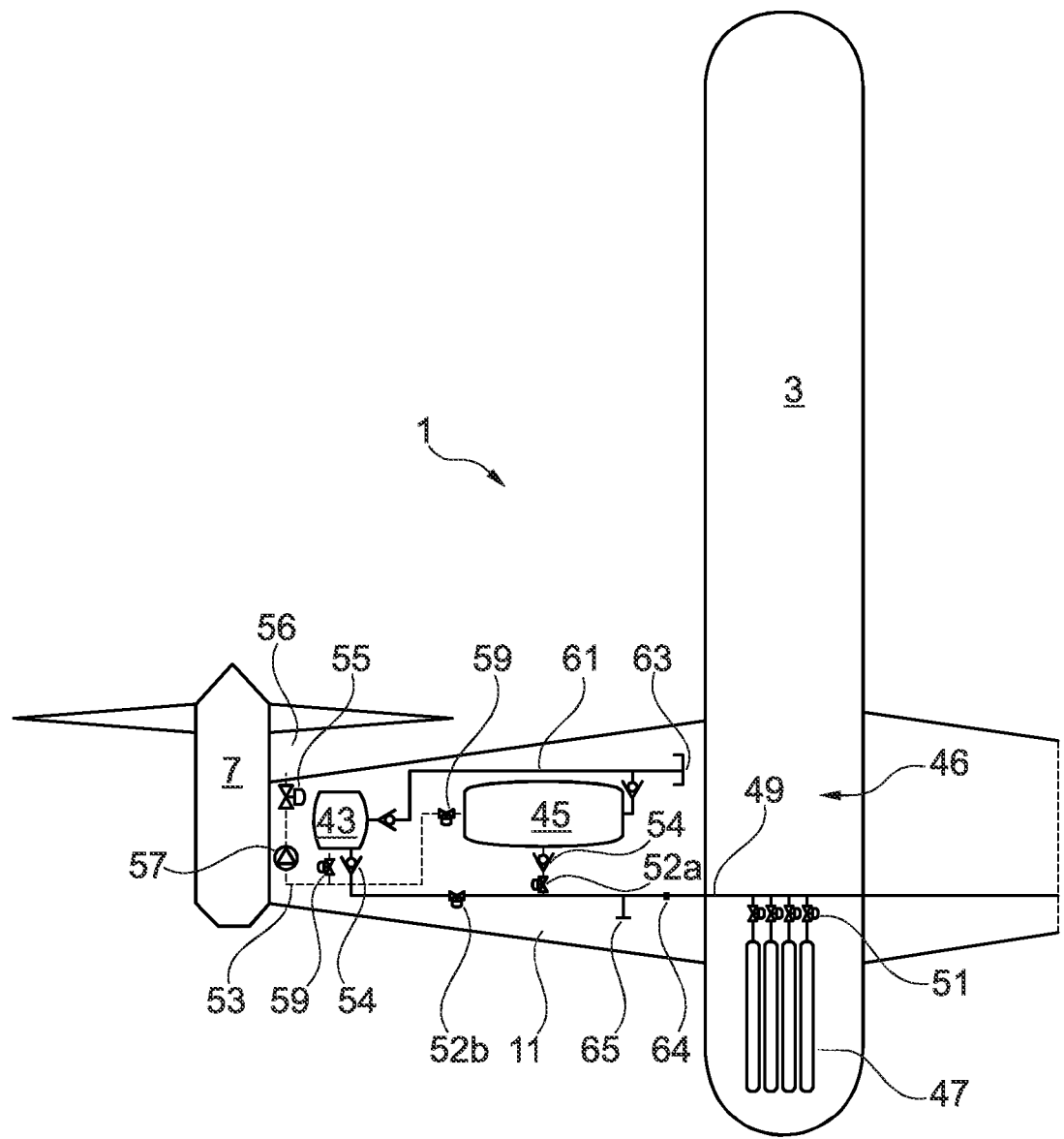
FIG. 4 shows a schematic top view of a buoyancy control system of the power generating apparatus.

Movement of the turbine assembly 5 from the first position to the second position is buoyancy assisted. FIG. 4 is a schematic plan view of the apparatus 1, showing the location of ballast tanks 43, 45 in the support structure 11 (only those in the left side support structure are shown, however the two support structures are identical).

In the embodiment shown, the support structures each include two ballast tanks, but in alternative embodiments there may be a single tank, or a greater number of tanks. The turbine assembly may also include a tank located on the nacelle.

The buoyancy of the turbine assembly is regulated by way of a buoyancy control system, indicated generally as 46, which includes a source of compressed air 47 (in this case in the form of a plurality of compressed air tanks) which communicate via a high pressure manifold 49, with the buoyancy tanks.

Gas flow into the tanks is regulated by way of a series of solenoid valves 51, 52 and non-return valves 54. The solenoid valves controlled by control unit (which, for simplicity, is not shown).

The buoyancy control system 46 further includes an inlet manifold 53, extending from an inlet 56, preferably located on an underside of the turbine assembly 5, so as to be under the water surface at all times. The tanks may be flooded with water by opening the inlet valve 55, optionally assisted by pump 57.

The inlet manifold includes further solenoid valves 59 downstream of the pump 57, by which the sequence in which the tanks are filled can be controlled.

The buoyancy control system also includes a vent manifold 61, extending between the tanks and a vent 63. The vent preferably exits from an upper face of the support structure at a location that is above the water surface at all times (i.e. normally close to the hinge arrangement). In alternative embodiments, the vent manifold may be routed through the hinge arrangement by way of flexible conduits (c.f. the high pressure manifold), so as to exit from the buoyancy vessel 3.

In normal use, when the turbine assemblies 5 are in the first position and the power generating apparatus 1 is configured to extract energy from a tidal flow, both of the ballast tanks 43, 45 are full of sea water and all of the solenoid valves 51, 52, 55, 59 are closed. In this configuration, each turbine assembly 5 is negatively buoyant and so biased towards the first position. Arrangements by which the turbine assemblies may be retained in the first position are discussed in further detail below.

In order to move each turbine assembly to the second position, the solenoid valves 51 are opened (typically simultaneously, but in some cases sequentially) so as to pressurise the high pressure manifold 53. Solenoid valve 52a, associated with the main tank 45, is then opened and water in the tank displaced by the flow of compressed air from the high pressure manifold, and vented via the vent manifold 61.

Figure 5:
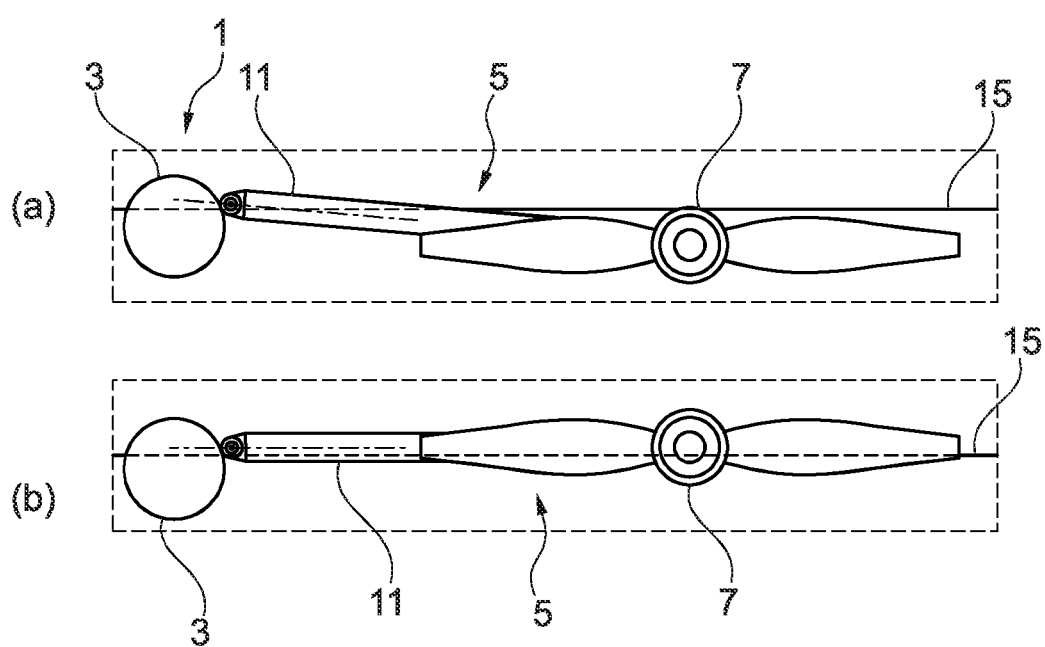
FIG. 5 shows schematic end views of a turbine assembly of the power generating apparatus (a) when the main buoyancy tank has been vented and (b) when both buoyancy tanks have been vented.

The air in the main tank 45 provides sufficient positive buoyancy to cause the turbine assembly to lift from the first position towards the second position. Once the turbine assembly begins to break the water surface, it becomes neutrally buoyant, however the nacelle 7 is not above (or sufficiently above) the water surface (FIG. 5(*a*)). The secondary tank 43 is then vented (by opening the valve 52b), to provide further positive buoyancy and raise the turbine assembly to the second position (FIG. 5(*b*)).

In order to ensure stability of the apparatus 1 as a whole, these steps are taken simultaneously for each turbine assembly 5.

In embodiments in which the apparatus 1 includes some form of end stop defining the second position (such as a buffer or latch), the positive buoyancy conveyed by venting the both tanks biases the turbine assemblies to the second position.

In the embodiment shown, however, the turbine assemblies 5 are free to move about the hinge arrangement 13 when in the second position, to allow for movement of the apparatus over waves.

In an alternative embodiment, the turbine assembly 5 may be able to reach the second position with the assistance of the buoyancy of the main tank 45 alone. In such embodiments, both of the buoyancy tanks 43, 45 may be vented initially, so as to move the turbine assembly 5 away from its first position. The motion may then be "damped" by partially or completely flooding the secondary tank 43, such that the positive buoyancy is reduced as the turbine assembly approaches the second position. This may be of particular benefit in order to reduce stresses transmitted through any buffer or latch arrangement by which the turbine assembly is retained in its second position.

Movement of the turbine assemblies back to the first position may also be buoyancy assisted, by generally reversing these procedures. When in the second position, with both of the buoyancy tanks 43, 45 empty, the solenoid valves 51, 52 are closed and the tanks are sequentially or simultaneously flooded by opening the inlet valve 55 and actuating the pump 57. Air is then displaced by sea water, via the vent manifold 61.

Similarly, it may be desirable for the motion towards the first position to be buffered by varying the buoyancy as the turbine assembly 5 approaches the first position. This may be achieved by partially or fully emptying the secondary tank 43, by opening the valves 51 and 52b and closing the control valves 55 and 59.

The buoyancy control system 46 will typically also include additional components such as flow regulators, control valves, pressure relief valves and the like, but these have been omitted for clarity. The buoyancy control system typically also includes a number of sensors in communication with the high pressure, vent and inlet manifolds and the tanks themselves, by which parameters such as pressure and/or fluid flow or fluid levels may be monitored and regulated as required.

Compressed air cylinders typically installed only when required. The buoyancy vessel may instead include a compressor, to supply compressed air to the tanks. Alternative embodiments may comprise, or further comprise, a pumping arrangement to pump water both into and air into and out of the tanks, as required.

Whilst the embodiment shown is provided with ballast tanks connected in parallel to the manifolds shown in parallel so as to provide for independent control, in alternative embodiments, the tanks may be connected in series, to one or more of the manifolds, so as to sequentially fill/empty.

The required electrical connections for control of the electrical components of the buoyancy control system 46, the wiring loom 42 extending from the nacelle 7 (not shown in FIG. 4) and the high pressure manifold conduit(s) must extend through the hinge arrangement 13 and are therefore flexible in this region. In addition, these systems are capable of being connected and disconnected (e.g. at high pressure pneumatic coupling 64), to enable the turbine assembly 5 to be connected/disconnected from the buoyancy vessel 3 in situ.

Thus, the turbine assembly may be rendered positively buoyant and floated into position to be coupled to the buoyancy position, for assembly or replacement of a turbine assembly, during which the electrical and pneumatic couplings can be joined. Similarly, the tanks may be vented, and the turbine assembly disconnected and floated away for maintenance.

The buoyancy control system 46 is configured to be connected to another source of compressed air, at connection 65. The electronic components of the system 46 may also be connected to another control system and power source. Thus, the buoyancy of the turbine assembly may be selectively controlled when not connected to the buoyancy vessel. This enables the buoyancy and trim of the assembly 5 to be adjusted during assembly/disassembly, by selectively varying the amount of water in the buoyancy tanks 43, 45.

Figure 6:
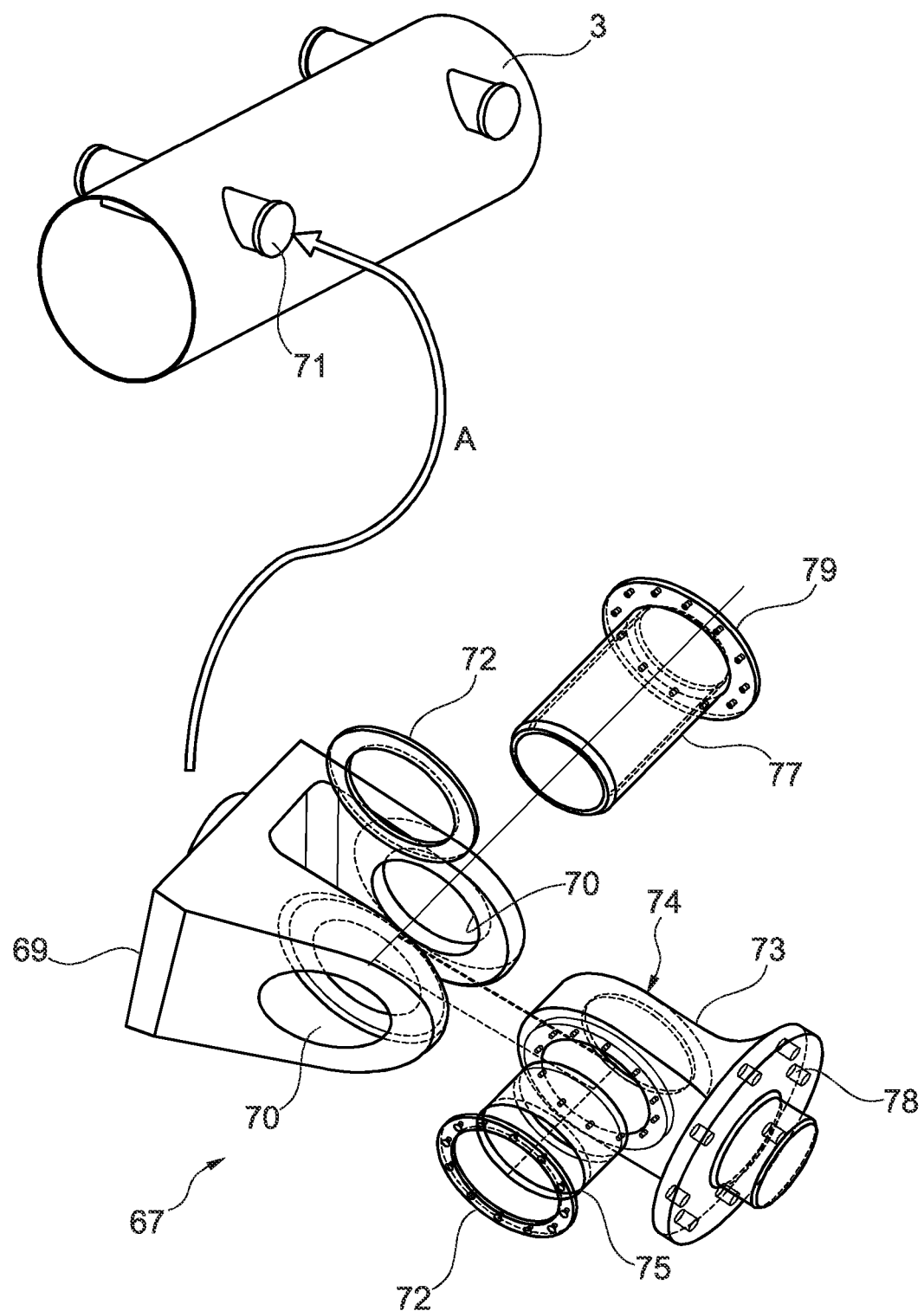
FIG. 6 is an exploded view of a hinge.

The apparatus 1 has a hinge arrangement 13 associated with each of the turbine assemblies 5. Each hinge arrangement includes two hinged connections (marked as 67 in FIG. 2(*b*)). FIG. 6 shows an exploded view of a hinge connection 67.

The hinge connection includes a cast clevis 69. This is bolted to the flange 71 on the buoyancy vessel 3, as shown by arrow A. Circular thrust bearings 72 are positioned on inner faces of the eyelets 70 of the clevis 69. A cast padeye 73 is similarly bolted to the inboard end 12 of the support structure 11, at the flange 78. Within the eyelet 74 of the padeye 73 is a fibre journal bearing 75.

To couple the turbine assembly 5 to the buoyancy vessel 3, the padeye 73 is inserted into the clevis 69 such that the eyelets 70, 74 align, and a tubular pin 77 is inserted and bolted (via a flange 79) to the clevis 69. Alternatively, it may be preferred for the hinge connection 67 to be pre-assembled, and for the coupling to be completed by bolting one or other of the clevis or eyelet to the buoyancy vessel or support structure, respectively.

Figure 7:
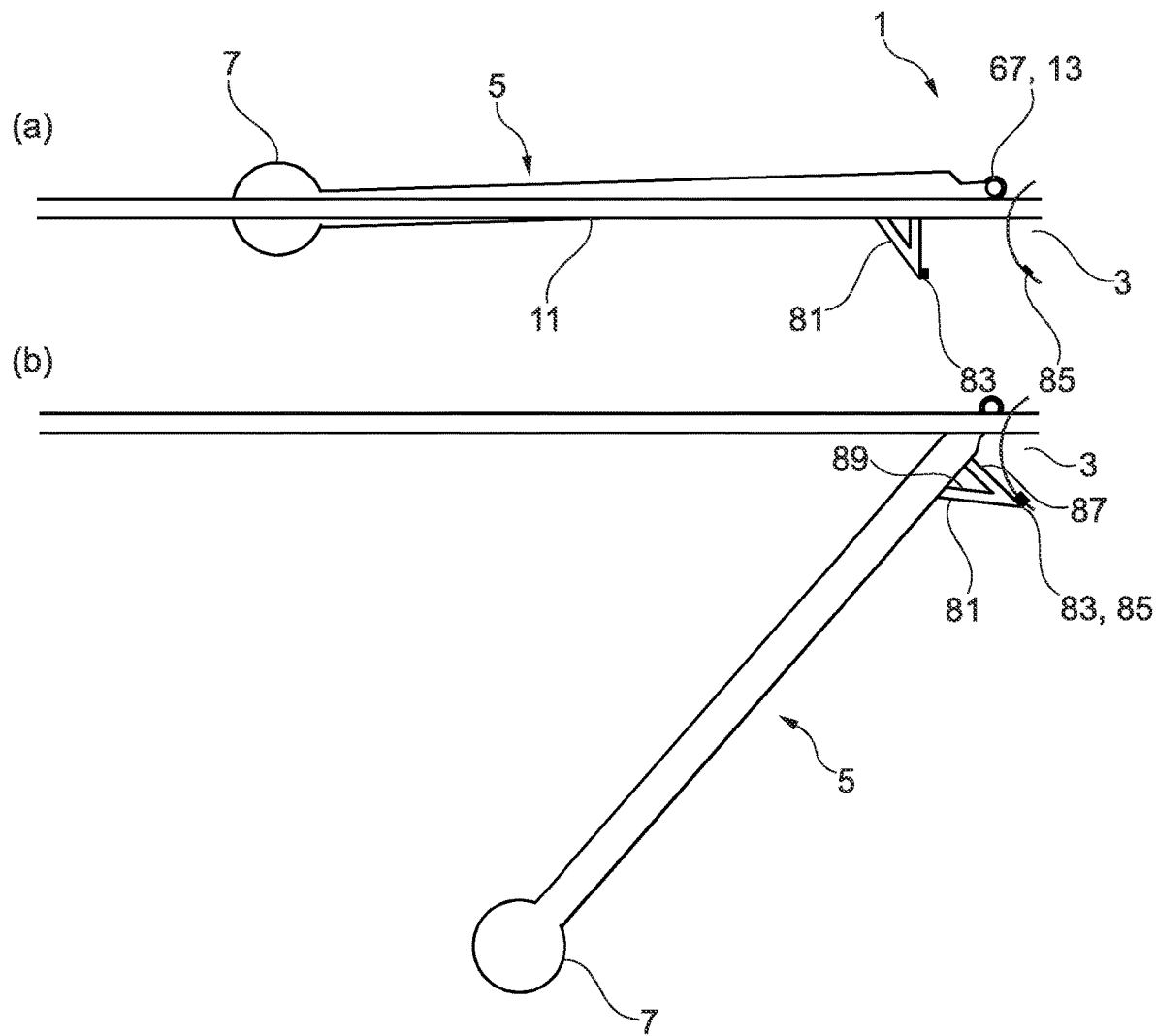
FIG. 7 is a schematic end view of the power generating apparatus, showing a magnetic latch arrangement.

FIG. 7 shows a schematic front view of the apparatus 1 in (a) the second position and (b) the first position. The support structure 11 in provided with an armature 81 having, at its apex, a cast steel block 83. The armature is equidistant from the hinge assemblies 67. Within the buoyancy vessel 3, is an electromagnet 85, which is positioned to be adjacent to the block 83 when the turbine assembly 5 is in its first position. A permanent magnet with mechanically switchable poles may also be used.

In use, the electromagnet 85 may be energised as the turbine assembly approaches the first position, so as to magnetically latch it into position, and prevent the turbine assembly from lifting from the first in adverse weather conditions.

Optionally, a corresponding arrangement may be used to latch the turbine assemblies in the second position.

In alternative embodiments, the opposed turbines assemblies 5 may be tethered together with a cable, to perform this function, an example of which is discussed below with reference to FIGS. 13 and 14. Mechanical latches may also be used.

The armature may be adapted to flex about the inboard arm 87 (for example by way of a telescopic hydraulic or elastomeric damper associated with the outboard arm 89), so as to act as a buffer or damper.

In an alternative embodiment (not shown) the armatures of the opposed turbine assemblies may be sized to contact one another, rather than the hull of the buoyancy vessel, so as to provide an end-stop" defining the first positions of the turbine assemblies.

Figure 8:
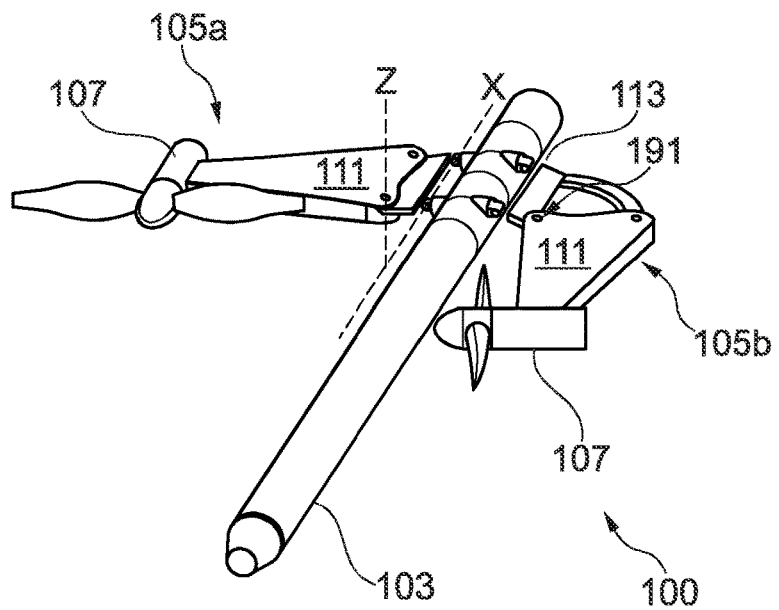
FIG. 8 is a perspective view of an alternative embodiment of a power generating apparatus.

FIG. 8 is a perspective view of an alternative embodiment 100 of a power generating apparatus. Features in common with the power generating apparatus 1 are provided with like reference numerals, incremented by 100.

Each turbine assembly 105 is moveable between a first and a second position, generally as described above. In addition, the support structure 111 of each turbine assembly includes a secondary hinge arrangement 191, which operates around an axis Z, perpendicular to the axis X of the primary hinge arrangement 113. Each turbine assembly is moveable from the second position (shown in relation to the assembly 105*a*) and a third position (shown in relation to assembly 105*b*), in which the nacelle 107 is close to the buoyancy vessel 103 so as to reduce the overall beam of the apparatus 100. In this configuration the apparatus 100 has less drag, which reduces energy costs and time to transport the apparatus over long distances. A reduced beam may also lower the risk of collision with other vessels, in transit and provide easier access to a quayside or pier.

Figure 9:
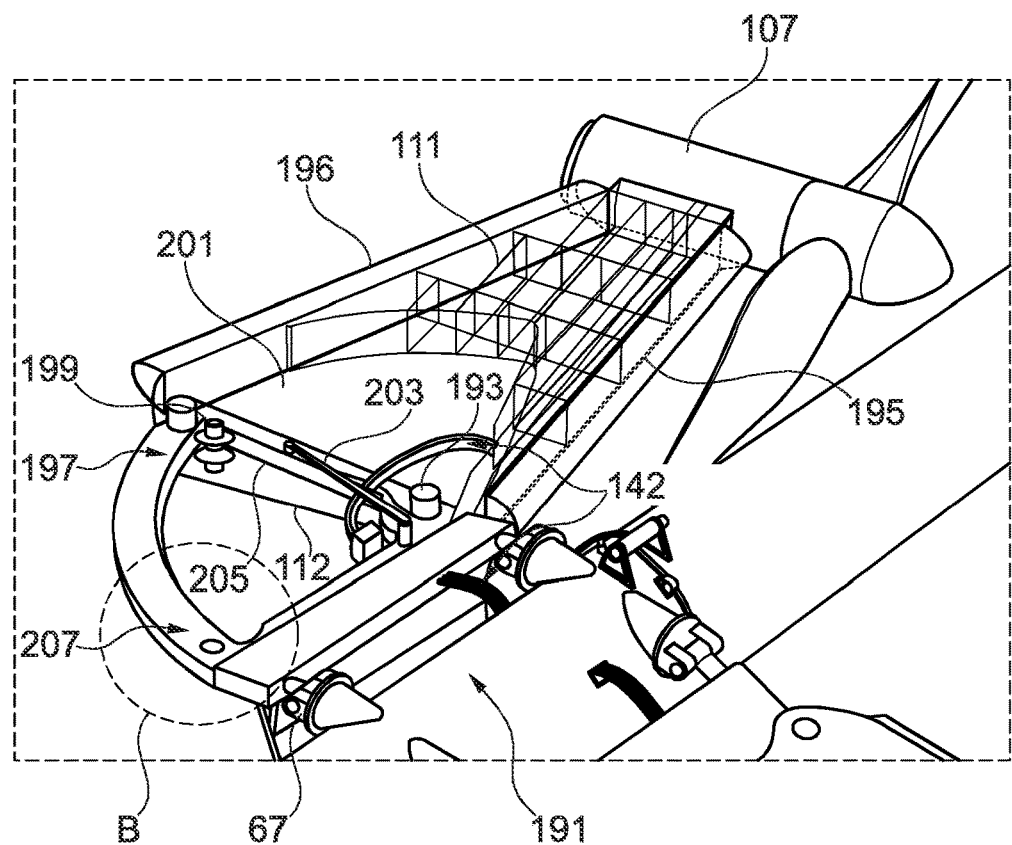
FIG. 9 is a close up view of a turbine assembly of the power generating apparatus of FIG. 8.

The secondary hinge arrangement 191 is shown in further detail in FIG. 9. The secondary hinge arrangement 191 includes a hinge 193 (of the same general pin and bushing type as the hinges 67) that is located adjacent to the leading edge 195 of the support structure 111. In addition, the hinge arrangement comprises an arcuate guide rail 197, and a support roller 199. The support roller is rotatably fixed towards the trailing edge 196 of the support structure, at the mouth of an internal cavity 201 in the inboard end 112 of support structure. When the turbine assembly 111 moves to the second position, the guide rail 197 is received in the cavity 201. Motion between the second and third positions is effected by way of a hydraulic ram 203. Since the turbine assembly is neutrally buoyant in the second position (and so still free to move about the hinge assembly 113, to accommodate wave motion), the hydraulic ram 203 is required only to overcome the inertia of the turbine assembly.

In the third position shown, the support arm 205 which extends between the secondary hinge 193 and the arcuate guide rail 197, abuts the support roller 199 and thereby functions as an end stop.

Figure 10:
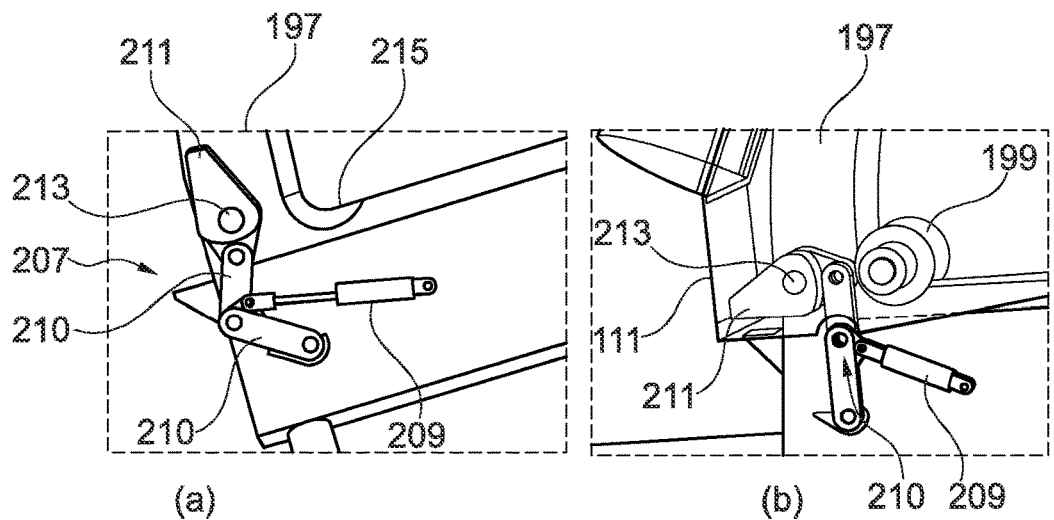
FIG. 10 is a detail view of a latch mechanism associated with a secondary hinge arrangement of the turbine assembly of FIG. 9.

The support structure 111 is also provided with a latch mechanism 207, shown in detail in FIGS. 10(*a*) and (*b*). FIG. 10(*a*) is a close up view of the area marked B in FIG. 9. The latch mechanism comprises a hydraulic ram 209 connected to linkages 210, by which the latch member 211 can be rotated around a pivot 213. The ram 209 is extended to release the latch (FIG. 10(*a*)). When the turbine assembly is in the second position and the support structure 111 abuts the end stop 215, the ram 209 can be retracted so as to pull the latch member against the internal face of the inboard end of the support structure 111 (FIG. 10(*b*)).

Figure 11:
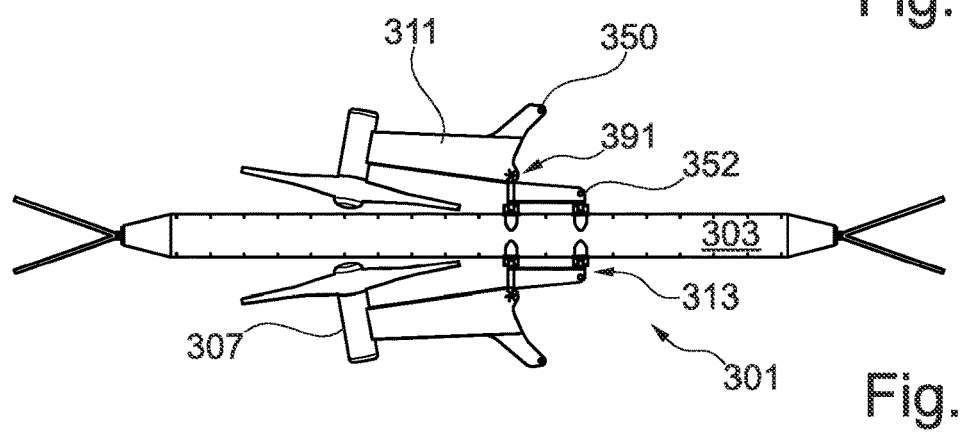
FIG. 11 is a top view of a further embodiment of a power generating apparatus.

A further embodiment of a power generating apparatus 301 is shown in FIG. 11. Features in common with the power generating apparatus 101 are provided with like reference numerals, incremented by 200. The power generating apparatus 301 is also provided with secondary hinge arrangements 391 that are perpendicular to the primary hinge arrangements 313, to enable the turbine assemblies 311 to rotate into a third position as shown in the figure.

The turbine assemblies 311 are provided with eyelets 350, 352 which, in the second position, are aligned and receive a latch pin (not shown) to retain the turbine assemblies in position (from where it is able to move between the first and second positions, generally as described above).

The turbine assemblies 311 lack a guide rail and associated apparatus. Since movement to the third position may be required very infrequently, it may be acceptable for some applications for this to be achieved by way of temporary apparatus such as potable cables/winches, or the like, which can be removed once the apparatus 301 is in situ.

Figure 12:
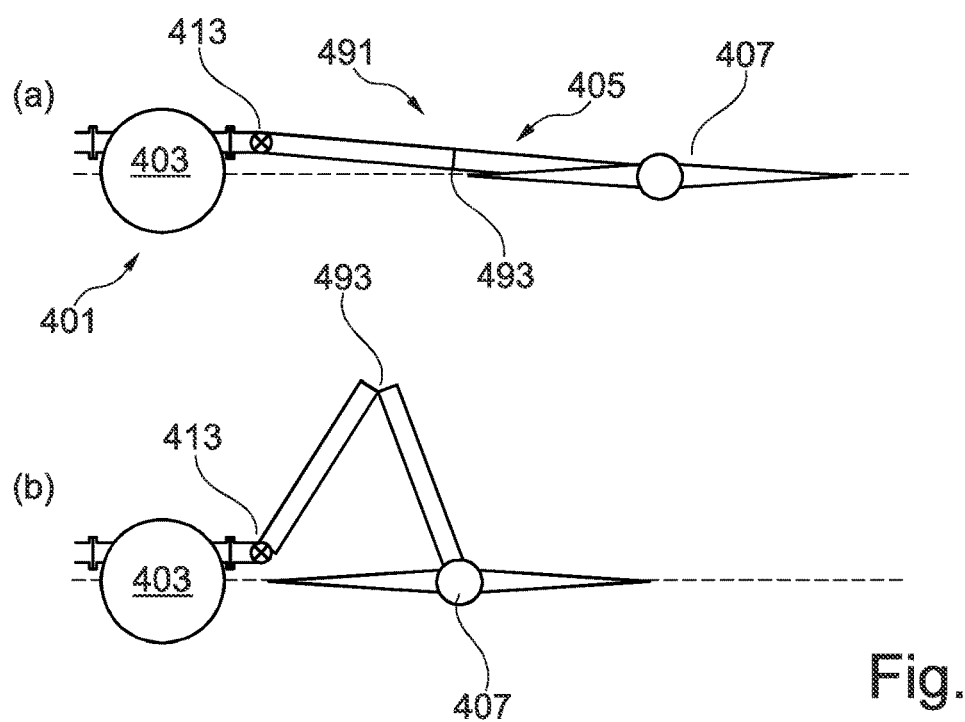
FIG. 12 is a schematic end view of another embodiment of a power generating apparatus with a turbine assembly (a) in a second position and (b) in a third position.

FIG. 12 is a schematic front view of a still further embodiment 401 of a power generating apparatus. Features in common with the power generating apparatus 1 are provided with like reference numerals, incremented by 400. The turbine assemblies 405 are moveable between the second position (shown in FIG. 12(a)) and a first position, generally as described above.

The support structure 411 of each turbine assembly is provided with a secondary hinge arrangement 491, comprising hinges 493 that operate around an axis that is parallel to the axis of the main hinge arrangement 413. The support structure can be concertinaed by folding around the secondary hinge arrangement 491 into the third position shown in in FIG. 12(b), so as to reduce the beam of the apparatus 401.

Figure 13:
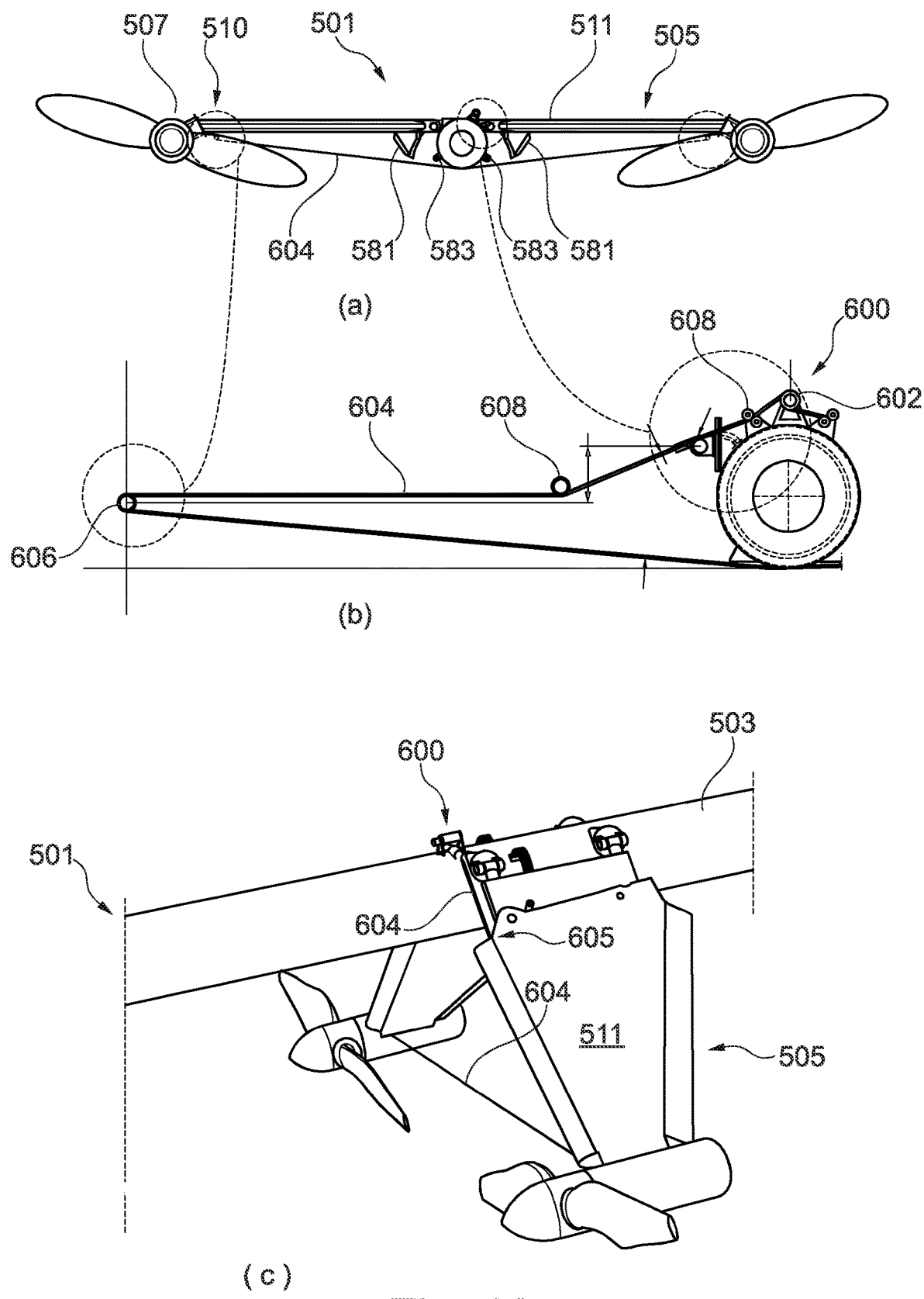
FIG. 13 shows (a) an end view of a still further embodiment of a power generating apparatus with the turbine assemblies in a second position (b) a schematic diagram of a winch and cable mechanism associated with the turbine assemblies and (c) a perspective view of the turbine assemblies in their first positions.

FIG. 13 shows a still further embodiment of a power generating apparatus 501. Features in common with the apparatus 1 are provided with like reference numerals, incremented by 500.

The power generating apparatus 501 has positively buoyant turbine assemblies 505. Positive buoyancy is provided by one or more sealed volumes within the turbine assemblies. The positive buoyancy force biases the turbine assemblies into their second positions, as shown in FIG. 13(a). The apparatus 501 is provided with a winch and pulley system by which the turbine assemblies can be moved to the first position. A topside winch 600 has a rotating reel 602 around which one end of a length of a braided steel cable 604 is wound. A free portion of the steel cable extends from the reel, through the support structures 511, around an outboard pulley wheel 606 at the outboard end 510 of the support structure 511, under the buoyancy vessel 503 and around the corresponding parts of the opposing turbine assembly. The other end of the cable 604 is wound around the reel 602.

The pathway of the cable 604 is illustrated in FIG. 13(b). In the region marked A, which is circled in the figures, it can be seen that the cable 604 passes between guide pulleys 608 and into an internal channel 605 within the support structure 511, at the inboard end 512 thereof.

In order to move the turbine assemblies 505 to the first position, the winch 600 is actuated so as to wind a greater length of the cable 604 around the reel 602. When the end stops 581 abut the buffers 583 affixed to the hull of the buoyancy vessel, the winch is stopped and the turbine assemblies are held in the first position (FIG. 13(c)) by tension in the cable 604. The tension in the cable is sufficient to overcome the positive buoyancy of the turbine assemblies.

To return the turbine assemblies to their first positions, the cable 604 is let out and the positive buoyancy force assists the motion towards the second position. The rate of rotation of the topside winch 600 may be controlled during this process, so as to limit the speed of movement of the turbine assemblies and to ensure that they move at the same speed as each other (ensuring that the turbine assembly 501 remains symmetrical, and thus stable).

The pulley and cable arrangement of the turbine assembly 501 may also be applied to embodiments having selectively variable buoyancy.

Figure 14:
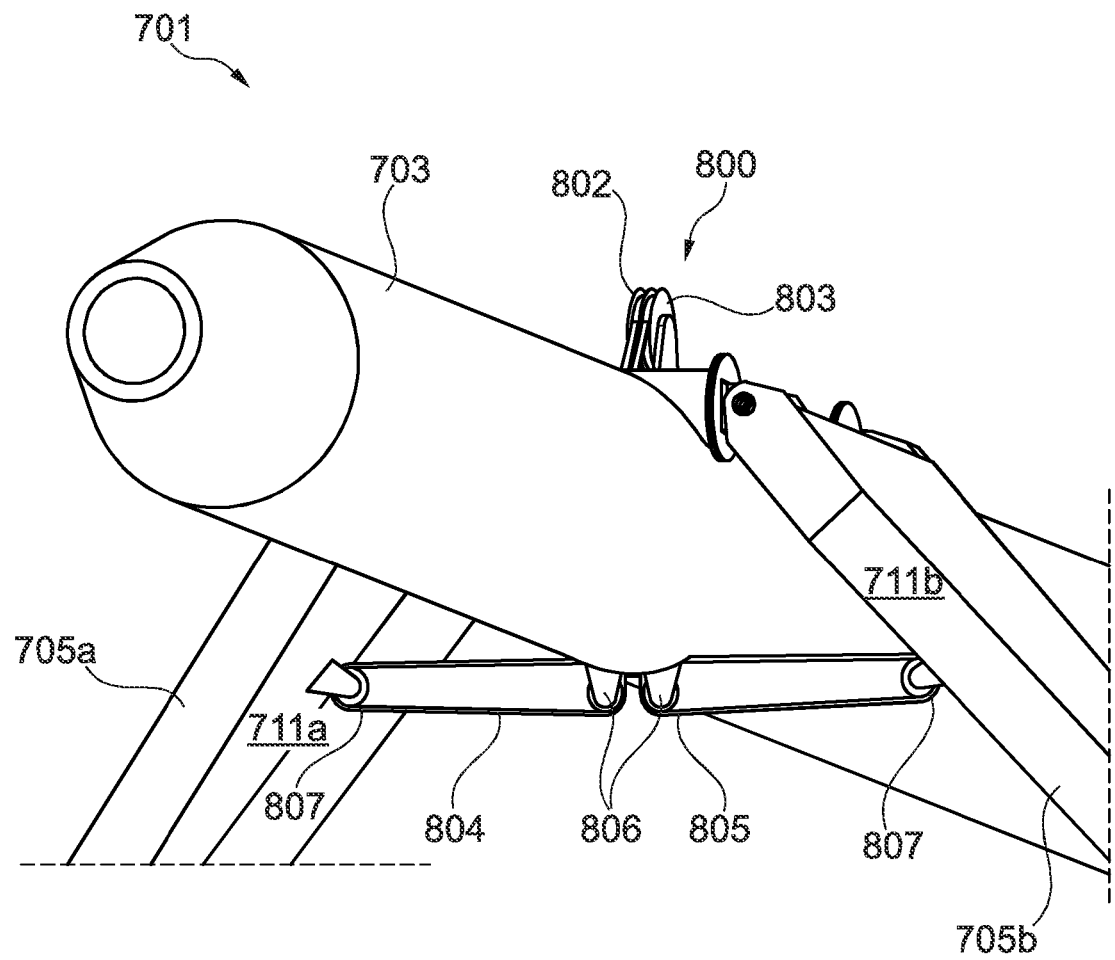
FIG. 14 is a perspective view of yet another embodiment of a power generating apparatus, having a powered mechanism for assisting movement of turbine assemblies between the first and second positions.

A further embodiment of a power generating apparatus 701 is shown in FIG. 14. Features in common with the apparatus 501 are provided with like reference numerals, incremented by 200.

The apparatus 701 has a powered mechanism similar to that of the apparatus 501, comprising a topside winch 800. The winch 800 comprises two reels, 802 and 803 which share a common axis and which are fixed to as to rotate together. Each of the reels 802 and 803 is secured to a separate cable 804 and 805, respectively associated with each turbine assembly 705a and 705b.

The cables 802, 803 extend from the respective reels through an enclosed channel in the buoyancy vessel, and around pulley wheels 806 and 807, mounted on the underside of the buoyancy vessel 703 and the support structures 711a and 711b, respectively. The ends of the cables may be anchored either on the vessel's underside or routed by further pulleys to be anchored above (not shown). The routing of the cables via pulleys located on the buoyancy vessel's underside may provide for increased leverage, and in turn reduce the depth at which the cable extend between the turbine assemblies when they are in their lower, first positions, in use.

The use of independent cables for each turbine assembly may be desirable in order to reduce or eliminate the possibility of "slippage" of a turbine assembly in relation to the cable, which might otherwise lead to instability of the power generating apparatus. Again, the winch may be used to "brake" motion towards the second position. The two reels fixed together ensure that the cables are let out at the same rate.

If one assembly were to move towards the second position before the other, then the imbalance of forces would act to roll the power generating apparatus, which would itself exacerbate the instability. This problem would be particularly severe if one turbine assembly were to hit an end stop (where present) before the other. By braking, or limiting the rate of motion of the turbine assemblies, as described above, any such instability is avoided or minimised.

Figure 15:
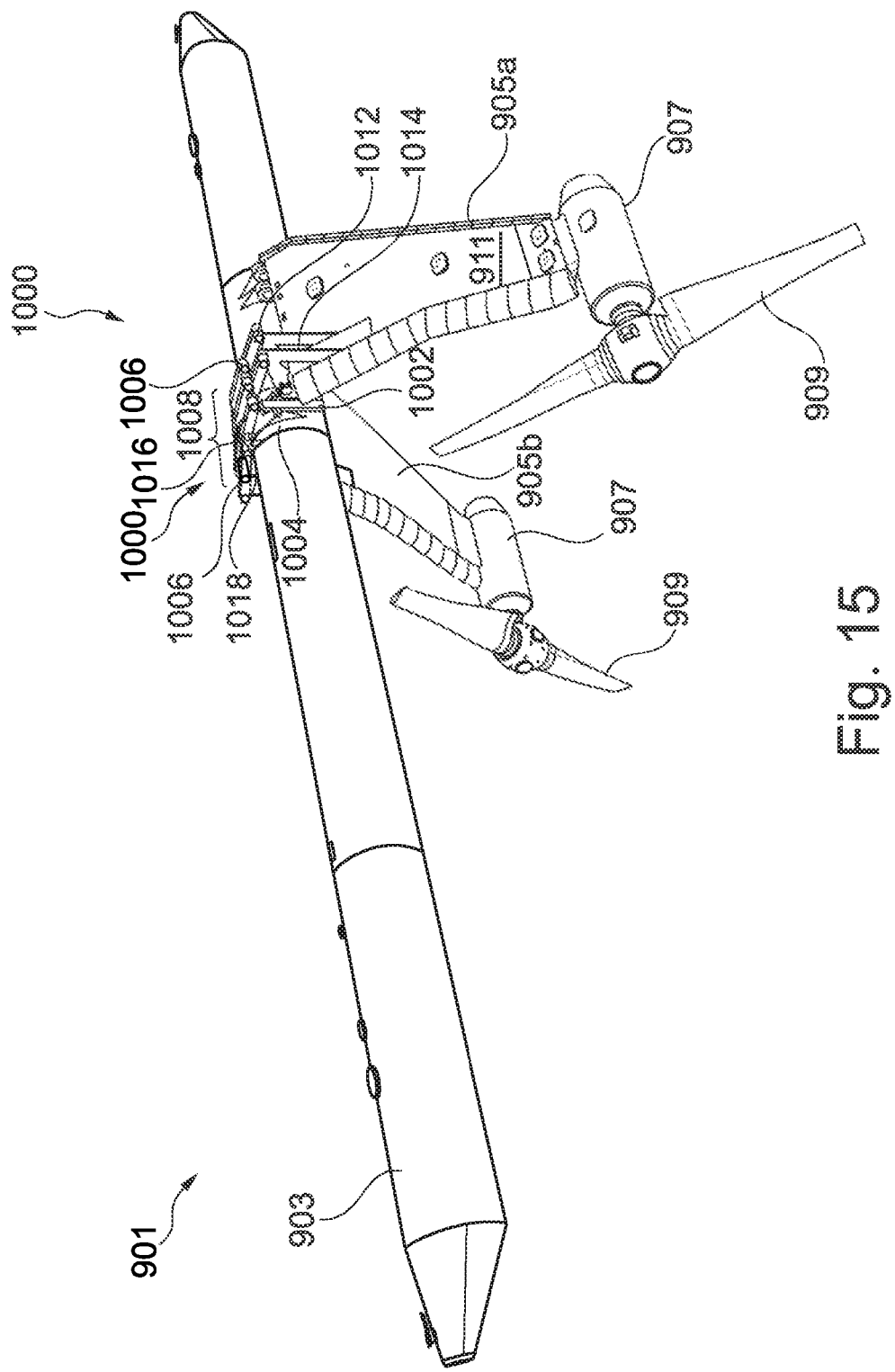
FIG. 15 is a perspective view of a further embodiment of a power generating apparatus, having a powered mechanism for assisting movement of turbine assemblies between the first and second positions.

Another power generating apparatus 901 is shown in FIG. 15. Features in common with the apparatus 701 are provided with like reference numerals, incremented by 200.

The power generating apparatus 901 has a buoyancy vessel 903, and turbine assemblies 905a,b coupled to each side of the buoyancy vessel, and symmetrically disposed about the buoyancy vessel. Each turbine assembly 905 has a nacelle 907, to which a turbine rotor 909 is rotatably mounted. The nacelles 907 are each coupled to the outboard end a support structure 911. At its inboard end, each support structure is coupled to the buoyancy vessel 903 via a hinge arrangement 913, generally as described above, so that each turbine assembly 905 is pivotally moveable between a first position shown in FIG. 16(a) and a second position shown in FIG. 16(b).

Each of the turbine assemblies 907a,b define a buoyant volume (not visible in the figures), in the form of a sealed tank housed within the support structure 911. Further voids are defined within the nacelles 907. These buoyant volumes provide a buoyant force to partially offset the weight of the turbine assemblies when they are submerged. In alternative embodiments, the turbine assemblies may be generally neutrally buoyant.

Movement between the first and second positions is controlled by way of a powered mechanism 1000 associated with each turbine assembly 905. The powered mechanism includes a hydraulic ram 1002 associated with each turbine assembly, which is pivotally connected to the buoyancy vessel 903 at a mounting point 1004.

Figure 17:
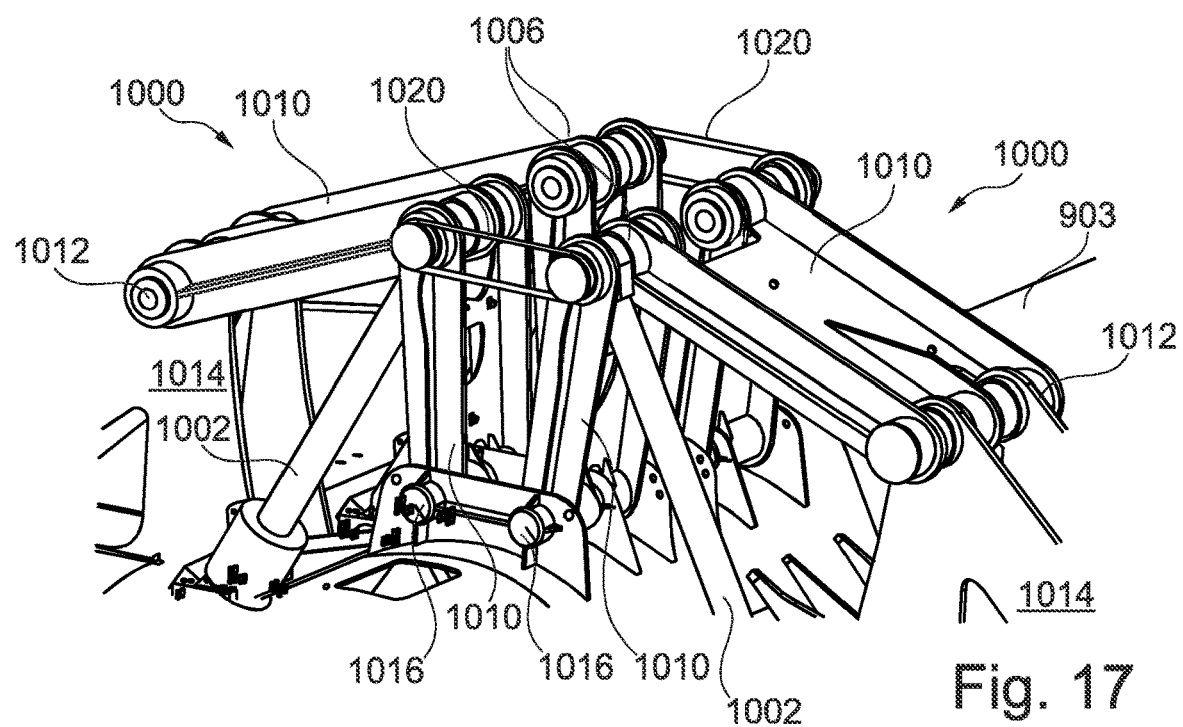
FIG. 17 shows a close up perspective view of the powered mechanism of the power generating apparatus of FIG. 15.

Each hydraulic ram 1002 is also pivotally connected at pivot point 1006 to a mechanical linkage arrangement 1008. Each mechanical linkage arrangement consists of a series of mechanical linkages 1010, and is coupled at a first end 1012 to a generally triangular fly brace 1014 on an upper side of each turbine assembly, and coupled at a second end 1016 to a bracket 1018 on the buoyancy vessel. The couplings at the first and second ends are both hinged. The components of the powered mechanism can be most clearly seen in the close up view of FIG. 17, in which the hydraulic rams are extended and the turbine assemblies are in the second position.

As shown in FIG. 16, the hydraulic rams 1002 can be extended and retracted, so as to move the turbine assemblies 905 between the first and second positions, respectively. The fly braces 1014 attach to the support structures 911 a distance away from the hinges 913, so as to increase the leverage applied by the powered mechanism 1000 to the turbine assemblies 905a,b.

Figure 16A:
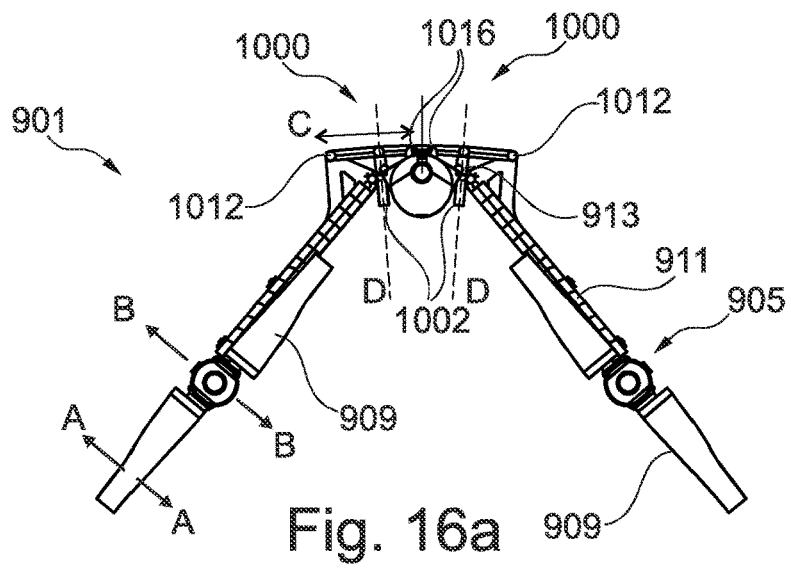
FIG. 16 shows end views of the power generating apparatus of FIG. 15 with the turbine assemblies in (a) the first position and (b) the second position.

In the first position (FIG. 16(a)) the rotors are positioned to harvest energy from flowing water. Changes in the flow rate or direction, such as changes in a tidal stream results, in forces being applied to the rotors 909 being transmitted to the buoyancy vessel 903 via the mechanical linkage arrangement. In addition, motion of the buoyancy vessel on the surface due to waves, currents etc. may also result in such relative forces being transmitted, due to inertia and hydrodynamic drag of the turbine assemblies. These forces may include those which act to urge the turbine assemblies to move around the hinges 913. The orientations of these dynamic forces are indicated generally by arrows A and B.

In the first position, the mechanical linkages 1010 of the mechanical linkage arrangement 1008 are longitudinally aligned between the first and second ends 1012, 1016. Thus, forces are transmitted between the turbine assemblies and the buoyancy vessel in the direction C, along the mechanical linkages. The axes D of the hydraulic rams 1002 is generally perpendicular to the direction C (which is aligned in the direction between the first and second ends) and so the dynamic forces C are not (or are only minimally) transmitted to the hydraulic rams. The rams 1002 are accordingly able to effectively retain the turbine assemblies 905 in the first position.

Figure 16B:
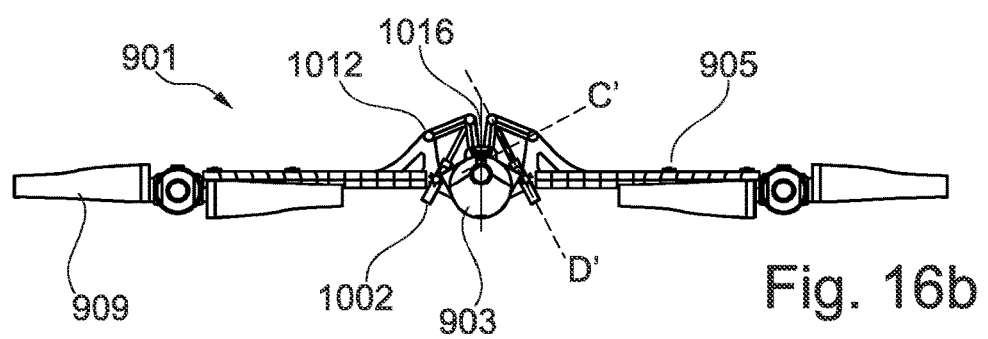

In the second position (FIG. 16(b)) the axis D' of the hydraulic rams and the line C' between the first and second ends 1012, 1016 has changed (along which dynamic forces are transmitted), but remain generally perpendicular to one another. Thus, throughout the range of motion of the turbine assemblies, the hydraulic rams 1002 are isolated from the dynamic forces.

It may be desirable for the turbine assemblies to be moderately negatively buoyant as a whole (e.g. to assist in maintaining the turbine assemblies in the second position). However, optionally the buoyant volumes may be configured to be ballasted, whereby by removing the ballast (e.g. by pumping water from the sealed tanks), the turbine assemblies may be rendered positively or neutrally buoyant, so that they can be moved to the second position in the event of a failure in the powered mechanism 1000.

Referring again to FIG. 17, to assist in maintaining the turbine assemblies in their second position, cable loops 1020 may be secured around the axles of the pivots 1006. Optionally, each powered mechanism may include more than one hydraulic ram (for example two per turbine assembly).

The control arrangement for the hydraulic rams may feature dual-counterbalance valves to prevent unintentional system movement such as accidental lowering during nacelle access operations.

Advantageously, all of the pivot points and hydraulic connections of the powered mechanisms 1000 are located above the waterline. This facilitates maintenance and repair in situ.

Optional position measurement of the degree of deployment of the rams 1002 (not shown in the figures) is used to provide feedback and allow dynamic synchronisation of the turbine assembly positions during raising and lowering between the first and second positons. In addition, flow dividers in the hydraulic circuit provide initial synchronisation between the turbine assemblies.

Whilst the invention has been described in connection with the foregoing illustrative embodiments, various modifications, additions and alterations may be made to the invention by one skilled in the art without departing from the scope of the claimed invention.

The invention claimed is:

1. A power generating apparatus for extracting energy from flowing water, comprising:
   a buoyancy vessel, and a turbine assembly coupled to the buoyancy vessel;
   the turbine assembly comprising a turbine rotor mounted to a nacelle, and a support structure;
   the support structure being coupled at its inboard end to the buoyancy vessel and at its outboard end to the nacelle;
   the turbine assembly being pivotally moveable between a first position and a second position;
   wherein the power generating apparatus has a single buoyancy vessel; and
   wherein, when the power generating apparatus is floating on a body of water,
      in the first position the nacelle is fully submerged below the water surface, and
      in the second position at least a part of the nacelle projects above the water surface.

2. The power generating apparatus of claim 1, comprising two, or more than two, turbine assemblies.

3. The power generating apparatus of claim 2, wherein the two or more turbine assemblies are symmetrically disposed about the buoyancy vessel.

4. The power generating apparatus according to claim 1, wherein the turbine assembly is configured to pivot around an axis that is generally parallel to a longitudinal axis of buoyancy vessel.

5. The power generating apparatus of claim 1, wherein, in the first position each said turbine assembly extends at least one of below and to the side of the buoyancy vessel and wherein, in the second position, said turbine assembly extends generally to the side of the buoyancy vessel.

6. The power generating apparatus according to claim 1, comprising a powered mechanism associated with the turbine assembly, for moving the turbine assembly between the first and second positions.

7. The power generating apparatus according to claim 1, wherein the turbine assembly defines one or more buoyant volumes,
   wherein the turbine assembly has a turbine and a movement of the turbine is at least one of from the first position to the second position and from the second position to the first position, and
   wherein said movement is buoyancy assisted.

8. The power generating apparatus of claim 7, further comprising a powered mechanism which is a primary means of moving the turbine between the first and second positions.

9. The power generating apparatus according claim 7, wherein the buoyancy of the turbine assembly is selectively variable.

10. The power generating apparatus of claim 7, wherein one or both of the support structure and the nacelle comprises one or more ballast tanks, operable to at least one of selectively filled with gas to increase buoyancy and flooded with water to reduce buoyancy.

11. The power generating apparatus of claim 1, wherein the turbine assembly is adapted to be latched in one or more of the first position or second position.

12. The power generating apparatus of claim 1, wherein movement towards one or more of the first position or second position is damped.

13. The power generating apparatus of claim 12, wherein the motion is mechanically damped, by a buffer or by a powered mechanism.

14. The power generating apparatus of claim 1, wherein the nacelle comprises an in-line electrical generator.

15. The power generating apparatus of claim 1, wherein the turbine rotor comprises at lease one of a variable-pitch rotor blades and a reversible pitch rotor blades.

16. The power generating apparatus according to claim 1, wherein the turbine assembly has a turbine rotor mounted to the nacelle and to said support structure; and
   wherein the support structure is configured to be coupled at the inboard end to the buoyancy vessel and the support structure is coupled at the outboard end to the nacelle.

17. The power generating apparatus of claim 1, wherein the turbine assembly defines one or more buoyant volumes.

18. The power generating apparatus of claim 1, wherein the nacelle comprises an in-line electrical generator which is a direct-drive generator.

* * * * *